United States Patent
Joseph et al.

(10) Patent No.: US 11,678,314 B2
(45) Date of Patent: Jun. 13, 2023

(54) PACKET DUPLICATION CARRIER ENHANCEMENTS

(71) Applicant: QUALCOMM Incorporated, San Diego, CA (US)

(72) Inventors: Vinay Joseph, San Diego, CA (US); Rajat Prakash, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/908,652

(22) Filed: Jun. 22, 2020

(65) Prior Publication Data
US 2020/0404660 A1    Dec. 24, 2020

Related U.S. Application Data

(60) Provisional application No. 62/865,851, filed on Jun. 24, 2019.

(51) Int. Cl.
| | |
|---|---|
| *H04W 72/0453* | (2023.01) |
| *H04L 1/1812* | (2023.01) |
| *H04B 17/318* | (2015.01) |
| *H04W 74/08* | (2009.01) |
| *H04W 72/23* | (2023.01) |

(52) U.S. Cl.
CPC ...... *H04W 72/0453* (2013.01); *H04B 17/318* (2015.01); *H04L 1/1812* (2013.01); *H04W 72/23* (2023.01); *H04W 74/0808* (2013.01)

(58) Field of Classification Search
CPC ............ H04W 72/0453; H04W 72/14; H04W 74/0808; H04L 1/1812; H04L 1/04; H04L 1/08; H04L 1/1896; H04B 17/318; H04B 17/327
See application file for complete search history.

(56) References Cited

U.S. PATENT DOCUMENTS

| | | | |
|---|---|---|---|
| 10,292,196 B2 * | 5/2019 | Tabet | H04L 1/1893 |
| 2018/0279262 A1 | 9/2018 | Babaei et al. | |
| 2018/0376457 A1 * | 12/2018 | Tseng | H04W 72/02 |
| 2019/0104476 A1 * | 4/2019 | Lim | H04W 52/367 |
| 2019/0215801 A1 * | 7/2019 | Mok | H04W 72/02 |
| 2019/0363843 A1 * | 11/2019 | Gordaychik | H04L 1/1854 |

(Continued)

OTHER PUBLICATIONS

3GPP TSG-RAN WG2 Meeting #106 R2-1905767 (Year: 2019).*

(Continued)

*Primary Examiner* — Yu-Wen Chang
(74) *Attorney, Agent, or Firm* — Holland & Hart LLP

(57) ABSTRACT

Methods, systems, and devices for wireless communications are described. A user equipment (UE) may receive an uplink packet duplication configuration that indicates a set of configured carriers and a number of copies of an uplink packet to transmit. In some examples, the UE may receive the uplink packet duplication configuration from a base station. The UE may select a subset of the set of configured carriers based on a selection criterion and the number of copies of the uplink packet to transmit, and transmit an uplink packet transmission that includes the copy of the uplink packet on each carrier of the subset of the set of configured carriers based on the uplink packet duplication configuration.

28 Claims, 18 Drawing Sheets

(56) References Cited

U.S. PATENT DOCUMENTS

| | | | | |
|---|---|---|---|---|
| 2019/0393989 | A1* | 12/2019 | Jung | H04L 1/08 |
| 2020/0059821 | A1* | 2/2020 | Wirth | H04L 1/1851 |
| 2020/0162366 | A1* | 5/2020 | Vrzic | H04L 1/08 |
| 2020/0213045 | A1* | 7/2020 | Lee | H04L 45/74 |
| 2020/0274654 | A1* | 8/2020 | Loehr | H04W 72/1247 |
| 2020/0382246 | A1* | 12/2020 | Lee | H04W 80/02 |
| 2021/0204301 | A1* | 7/2021 | Lee | H04W 28/06 |
| 2021/0297901 | A1* | 9/2021 | Tang | H04L 1/188 |
| 2022/0014961 | A1* | 1/2022 | Baek | H04L 1/1614 |
| 2022/0116159 | A1* | 4/2022 | Laselva | H04W 72/044 |

OTHER PUBLICATIONS

3GPP TSG-RAN WG2 Meeting #106 R2-1906191 (Year: 2019).*
3GPP TSG-RAN WG2 Meeting #106 R2-1906365 (Year: 2019).*
3GPP TSG-RAN WG2 Meeting #106 R2-1906510 (Year: 2019).*
Catt: "Dynamic Leg Selection with DC+CA Duplication", 3GPP Draft, 3GPP TSG-RAN WG2 Meeting #105bis, R2-1903141—Dynamic Leg Selection With DC+CA Duplication, 3rd Generation Partnership Project (3GPP), Mobile Competence Centre, 650, Route Des Lucioles, F-06921 Sophia-Antipolis Cedex, FR, vol. RAN WG2, No. Xi 'an, China, Apr. 8, 2019-Apr. 12, 2019, Apr. 6, 2019 (Apr. 6, 2019), XP051700495, 5 Pages, Retrieved from the Internet: URL: http://www.3gpp.org/ftp/Meetings%5F3GPP%5FSYNC/RAN2/Docs/R2%2D1903141%2Ezip [retrieved on Apr. 6, 2019] The Whole Document.
Ericsson: "104_40NR_IIOT PDCP Duplication Report of Email Discussion, TP", 3GPP Draft, D3GPP TSG-RAN WG2 #105, R2-1902362_104_40NR_IIOT_PDCPDuplication_Report of Email Discussion_TP, 3rd Generation Partnership Project (3GPP), Mobile Competence Centre, 650, Route Des Lucioles, F-06921, Sophia-Anti, vol. RAN WG2, No. Athens, Greece, Feb. 25, 2019-Mar. 1, 2019, Mar. 1, 2019 (Mar. 1, 2019), XP051603671, 29 Pages, Retrieved from the Internet: URL: http://www.3gpp.org/ftp/tsg%5Fran/WG2%5FRL2/TSGR2%5F105/Docs/R2%2D1902362%2Ezip [retrieved on Mar. 1, 2019] The Whole Document.
International Search Report and Written Opinion—PCT/US2020/039152—ISA/EPO—dated Oct. 9, 2020.
QUALCOMM Incorporated: "PDCP Duplication Enhancements for URLLC Traffic", 3GPP Draft, R2-1907927, 3GPP TSG-RAN WG2 Meeting #106, PDCP Duplication Enhancements for URLLC Traffic_VSubmit, 3rd Generation Partnership Project (3GPP), Mobile Competence Centre, 650, Route Des Lucioles, F-06921 Sophia-Antipolis, vol. RAN WG2, No. Reno, USA, May 13, 2019-May 17, 2019, May 3, 2019 (May 3, 2019), XP051712183, 4 Pages, Retrieved from the Internet: URL:http://www.3gpp.org/ftp/tsg%5Fran/WG2%5FRL2/TSGR2%5F106/Docs/R2%2D1907927%2Ezip [retrieved on May 3, 2019] The Whole Document.

* cited by examiner

PACKET DUPLICATION CARRIER ENHANCEMENTS

CROSS REFERENCE

The present application for patent claims the benefit of U.S. Provisional Patent Application No. 62/865,851 by JOSEPH et al., entitled "PACKET DUPLICATION CARRIER ENHANCEMENTS," filed Jun. 24, 2019, assigned to the assignee hereof, and expressly incorporated by reference herein.

FIELD OF TECHNOLOGY

The following relates generally to wireless communications and more specifically to packet duplication carrier enhancements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices. Some wireless communications systems may support retransmission of a packet to improve reliability of a transmission. As demand for communication efficiency increases, some wireless communications systems may lack capabilities to support higher reliability for packet transmissions while improving resource usage and, in some examples, reducing interference between multiple communication devices. Therefore improved techniques are desired.

SUMMARY

The described techniques relate to improved methods, systems, devices, and apparatuses that support packet transmission, and more particularly support enhanced duplication of packets and transmission of the duplicated packets. Generally, the described techniques may enable a user equipment (UE) to receive an uplink packet duplication configuration that indicates a set of configured carriers and a number of copies of an uplink packet to transmit. In some cases, UEs may select a subset of the set of configured carriers based on a selection criterion and the number of copies of the uplink packet to transmit. For example, UEs may select one or more carriers of the set based on a result of a listen-before-talk (LBT) procedure, a signal strength measurement relating to one or more directional beams (e.g., uplink beams) of the UEs carrying the carriers, or both. UEs may transmit an uplink packet transmission including the copy of the uplink packet on each carrier of the subset of the set of configured carriers according to the uplink packet duplication configuration. The described techniques may therefore enable UEs to experience reduced power consumption, improved reliability for packet transmissions, increased spectral efficiency, higher data rates and, in some examples, low latency for wireless communications, among other benefits.

A method of wireless communications by a UE is described. The method may include receiving an uplink packet duplication configuration that indicates a set of configured carriers and a number of copies of an uplink packet to transmit, selecting a subset of the set of configured carriers based on a selection criterion and the number of copies of the uplink packet to transmit, and transmitting an uplink packet transmission including the copy of the uplink packet on each carrier of the subset of the set of configured carriers based on the uplink packet duplication configuration.

An apparatus for wireless communications is described. The apparatus may include a processor, memory coupled with the processor, and instructions stored in the memory. The instructions may be executable by the processor to cause the apparatus to receive an uplink packet duplication configuration that indicates a set of configured carriers and a number of copies of an uplink packet to transmit, select a subset of the set of configured carriers based on a selection criterion and the number of copies of the uplink packet to transmit, and transmit an uplink packet transmission including the copy of the uplink packet on each carrier of the subset of the set of configured carriers based on the uplink packet duplication configuration.

Another apparatus for wireless communications is described. The apparatus may include means for receiving an uplink packet duplication configuration that indicates a set of configured carriers and a number of copies of an uplink packet to transmit, selecting a subset of the set of configured carriers based on a selection criterion and the number of copies of the uplink packet to transmit, and transmitting an uplink packet transmission including the copy of the uplink packet on each carrier of the subset of the set of configured carriers based on the uplink packet duplication configuration.

A non-transitory computer-readable medium storing code for wireless communications by a UE is described. The code may include instructions executable by a processor to receive an uplink packet duplication configuration that indicates a set of configured carriers and a number of copies of an uplink packet to transmit, select a subset of the set of configured carriers based on a selection criterion and the number of copies of the uplink packet to transmit, and transmit an uplink packet transmission including the copy of the uplink packet on each carrier of the subset of the set of configured carriers based on the uplink packet duplication configuration.

Some examples of the method, apparatuses, and non-transitory computer-readable medium described herein may further include operations, features, means, or instructions for receiving control signaling that indicates a periodic grant for uplink transmission, where the uplink packet transmission including the copy of the uplink packet may be transmitted on a carrier of the subset of the set of configured carriers based on the periodic grant.

Some examples of the method, apparatuses, and non-transitory computer-readable medium described herein may further include operations, features, means, or instructions for receiving downlink control information (DCI) that indicates a grant for uplink transmission, where the uplink packet transmission including the copy of the uplink packet may be transmitted on a carrier of the subset of the set of configured carriers based on the grant.

Some examples of the method, apparatuses, and non-transitory computer-readable medium described herein may further include operations, features, means, or instructions for receiving signaling that indicates the selection criterion.

In some examples of the method, apparatuses, and non-transitory computer-readable medium described herein, selecting the subset of the set of configured carriers may include operations, features, means, or instructions for selecting the subset of the set of configured carriers based on a result of a clear channel assessment (CCA) procedure performed on at least one carrier of the set of configured carriers.

In some examples of the method, apparatuses, and non-transitory computer-readable medium described herein, the selection criterion may be based on the result of the CCA procedure indicating carrier availability.

In some examples of the method, apparatuses, and non-transitory computer-readable medium described herein, selecting the subset of the set of configured carriers may include operations, features, means, or instructions for determining not to transmit a copy of the uplink packet on a first carrier of the set of carriers based at least on part on determining that a number of transmissions of the copy of the uplink packet satisfies the number of copies of the uplink packet to transmit.

In some examples of the method, apparatuses, and non-transitory computer-readable medium described herein, selecting the subset of the set of configured carriers may include operations, features, means, or instructions for determining not to transmit a copy of the uplink packet on any carrier of the set of configured carriers having a signal strength measurement that does not satisfy a threshold.

In some examples of the method, apparatuses, and non-transitory computer-readable medium described herein, selecting the subset of the set of configured carriers may include operations, features, means, or instructions for selecting the subset of the set of configured carriers based on a signal strength metric generated for a carrier of the set of configured carriers.

In some examples of the method, apparatuses, and non-transitory computer-readable medium described herein, the signal strength metric may be a reference signal received power (RSRP) metric, a reference signal metric, a channel quality metric, a signal to interference plus noise ratio (SINR) metric, signal to noise ratio (SNR) metric, a rank metric, or any combination thereof.

In some examples of the method, apparatuses, and non-transitory computer-readable medium described herein, the selection criterion may be based on comparing the signal strength metric to a signal strength threshold.

In some examples of the method, apparatuses, and non-transitory computer-readable medium described herein, selecting the subset of the set of configured carriers may include operations, features, means, or instructions for generating a signal strength measurement for one or more of the set of configured carriers, ordering the set of configured carriers based on the one or more signal strength measurements, and selecting the subset of the set of configured carriers based on the ordering and the number of copies of the uplink packet to transmit.

In some examples of the method, apparatuses, and non-transitory computer-readable medium described herein, the signal strength measurement for each carrier of the subset of the set of configured carriers satisfies a signal strength threshold indicated in the selection criterion.

In some examples of the method, apparatuses, and non-transitory computer-readable medium described herein, the signal strength measurement for at least one carrier of the subset of the set of configured carriers satisfies a signal strength threshold indicated in the selection criterion.

In some examples of the method, apparatuses, and non-transitory computer-readable medium described herein, generating the signal strength measurement may include operations, features, means, or instructions for generating the signal strength measurement for a downlink beam.

In some examples of the method, apparatuses, and non-transitory computer-readable medium described herein, selecting the subset of the set of configured carriers may include operations, features, means, or instructions for selecting the subset of the set of configured carriers based on an exposure metric determined for transmissions on the subset of the carriers.

In some examples of the method, apparatuses, and non-transitory computer-readable medium described herein, the selection criterion may be based on a comparison of an exposure metric to a permissible exposure threshold.

In some examples of the method, apparatuses, and non-transitory computer-readable medium described herein, selecting the subset of the set of configured carriers may include operations, features, means, or instructions for determining to transmit on one or more of the set of configured carriers based on detecting exposure crossing an exposure threshold.

In some examples of the method, apparatuses, and non-transitory computer-readable medium described herein, selecting the subset of the set of configured carriers may include operations, features, means, or instructions for determining a number of carriers to include in the subset based on detecting exposure crossing an exposure threshold.

In some examples of the method, apparatuses, and non-transitory computer-readable medium described herein, the uplink packet duplication configuration indicates the selection criterion.

In some examples of the method, apparatuses, and non-transitory computer-readable medium described herein, the uplink packet transmission may be an initial transmission of the uplink packet or a retransmission of the uplink packet.

In some examples of the method, apparatuses, and non-transitory computer-readable medium described herein, the uplink packet duplication configuration may be an uplink packet data convergence protocol (PDCP) duplication configuration.

In some examples of the method, apparatuses, and non-transitory computer-readable medium described herein, the number of copies of the uplink packet may be one of a minimum or maximum number of copies of the uplink packet to transmit.

In some examples of the method, apparatuses, and non-transitory computer-readable medium described herein, selecting the subset of the set of configured carriers may include operations, features, means, or instructions for selecting the subset of the set of configured carriers based on one or more of a number of hybrid automatic repeat request (HARQ) retransmissions of a copy of the uplink packet or a number of HARQ retransmissions of a copy of a previous uplink packet.

A method of wireless communications by a base station is described. The method may include transmitting, to a UE, an uplink packet duplication configuration that indicates a set of configured carriers and a number of copies of an uplink packet to transmit and monitoring for an uplink packet transmission including a copy of the uplink packet via at least one carrier of a subset of the set of configured carriers based on the uplink packet duplication configuration.

An apparatus for wireless communications is described. The apparatus may include a processor, memory coupled with the processor, and instructions stored in the memory. The instructions may be executable by the processor to cause the apparatus to transmit, to a UE, an uplink packet duplication configuration that indicates a set of configured carriers and a number of copies of an uplink packet to transmit and monitor for an uplink packet transmission including a copy of the uplink packet via at least one carrier of a subset of the set of configured carriers based on the uplink packet duplication configuration.

Another apparatus for wireless communications is described. The apparatus may include means for transmitting, to a UE, an uplink packet duplication configuration that indicates a set of configured carriers and a number of copies of an uplink packet to transmit and monitoring for an uplink packet transmission including a copy of the uplink packet via at least one carrier of a subset of the set of configured carriers based on the uplink packet duplication configuration.

A non-transitory computer-readable medium storing code for wireless communications by a base station is described. The code may include instructions executable by a processor to transmit, to a UE, an uplink packet duplication configuration that indicates a set of configured carriers and a number of copies of an uplink packet to transmit and monitor for an uplink packet transmission including a copy of the uplink packet via at least one carrier of a subset of the set of configured carriers based on the uplink packet duplication configuration.

Some examples of the method, apparatuses, and non-transitory computer-readable medium described herein may further include operations, features, means, or instructions for selecting the subset of the set of configured carriers based on a selection criterion and the number of copies of the uplink packet to transmit.

Some examples of the method, apparatuses, and non-transitory computer-readable medium described herein may further include operations, features, means, or instructions for receiving the uplink packet transmission including the copy of the uplink packet via a carrier of the subset of the set of configured carriers.

Some examples of the method, apparatuses, and non-transitory computer-readable medium described herein may further include operations, features, means, or instructions for transmitting control signaling that indicates a periodic grant for uplink transmission for transmitting the uplink packet transmission including the copy of the uplink packet on a carrier of the subset of the set of configured carriers.

Some examples of the method, apparatuses, and non-transitory computer-readable medium described herein may further include operations, features, means, or instructions for transmitting DCI that indicates a grant for uplink transmission for transmitting the uplink packet transmission including the copy of the uplink packet on a carrier of the subset of the set of configured carriers.

Some examples of the method, apparatuses, and non-transitory computer-readable medium described herein may further include operations, features, means, or instructions for transmitting signaling to the UE that indicates a selection criterion for selecting the subset.

Some examples of the method, apparatuses, and non-transitory computer-readable medium described herein may further include operations, features, means, or instructions for selecting the subset of the set of configured carriers based on a result of an estimated CCA procedure for the UE performed on a carrier of the set of configured carriers.

In some examples of the method, apparatuses, and non-transitory computer-readable medium described herein, a selection criterion for selecting the subset may be the result of the estimated CCA procedure indicating carrier availability.

In some examples of the method, apparatuses, and non-transitory computer-readable medium described herein, monitoring for the uplink packet transmission including the copy of the uplink packet via at least one carrier of the subset of the set of configured carriers may include operations, features, means, or instructions for determining not to monitor for a copy of the uplink packet on a first carrier of the set of carriers based at least on part on determining that a number of transmissions of the copy of the uplink packet satisfies the number of copies of the uplink packet to transmit.

In some examples of the method, apparatuses, and non-transitory computer-readable medium described herein, monitoring for the uplink packet transmission including the copy of the uplink packet via at least one carrier of the subset of the set of configured carriers may include operations, features, means, or instructions for determining not to monitor for a copy of the uplink packet on any carrier of the set of configured carriers having a signal strength measurement that does not satisfy a threshold.

In some examples of the method, apparatuses, and non-transitory computer-readable medium described herein, selecting the subset of the set of configured carriers may include operations, features, means, or instructions for selecting the subset of the set of configured carriers based on a signal strength metric generated for each carrier of the set of configured carriers.

In some examples of the method, apparatuses, and non-transitory computer-readable medium described herein, the signal strength metric may be a measurement of an uplink reference signal, a measurement of a sounding reference signal, a measurement of a demodulation reference signal, an RSRP metric, a reference signal metric, a sounding reference signal metric, a channel quality metric, an SINR metric, an SNR metric, a rank metric, or any combination thereof.

In some examples of the method, apparatuses, and non-transitory computer-readable medium described herein, a selection criterion for selecting the subset may be a signal strength threshold.

In some examples of the method, apparatuses, and non-transitory computer-readable medium described herein, selecting the subset of the set of configured carriers may include operations, features, means, or instructions for generating a signal strength measurement for one more of the set of configured carriers, ordering the set of configured carriers based on the one or more signal strength measurements, and selecting the subset of the set of configured carriers based on the ordering and the number of copies of the uplink packet to transmit.

In some examples of the method, apparatuses, and non-transitory computer-readable medium described herein, the signal strength measurement for each carrier of the subset of the set of configured carriers satisfies a signal strength threshold indicated in a selection criterion for selecting the subset.

In some examples of the method, apparatuses, and non-transitory computer-readable medium described herein, the signal strength measurement for at least one carrier of the subset of the set of configured carriers satisfies a signal strength threshold indicated in a selection criterion for selecting the subset.

In some examples of the method, apparatuses, and non-transitory computer-readable medium described herein, generating the signal strength measurement may include operations, features, means, or instructions for generating the signal strength measurement based on a measurement of a sounding reference signal transmitted by the UE.

In some examples of the method, apparatuses, and non-transitory computer-readable medium described herein, the uplink packet duplication configuration indicates a selection criterion for selecting the subset.

In some examples of the method, apparatuses, and non-transitory computer-readable medium described herein, the uplink packet transmission may be an initial transmission of the uplink packet or a retransmission of the uplink packet.

In some examples of the method, apparatuses, and non-transitory computer-readable medium described herein, the uplink packet duplication configuration may be an uplink PDCP duplication configuration.

In some examples of the method, apparatuses, and non-transitory computer-readable medium described herein, the number of copies of the uplink packet may be a minimum or maximum number of copies of the uplink packet to transmit.

In some examples of the method, apparatuses, and non-transitory computer-readable medium described herein, monitoring for the uplink packet transmission including the copy of the uplink packet on at least one carrier of the subset of the set of configured carriers may include operations, features, means, or instructions for monitoring a shared radio frequency band for the uplink packet transmission including the copy of the uplink packet on a carrier of the subset of the set of configured carriers.

In some examples of the method, apparatuses, and non-transitory computer-readable medium described herein, monitoring for the uplink packet transmission including the copy of the uplink packet on at least one carrier of the subset of the set of configured carriers may include operations, features, means, or instructions for monitoring a frequency range 2 (FR2) frequency band for the uplink packet transmission including the copy of the uplink packet on a carrier of the subset of the set of configured carriers.

DETAILED DESCRIPTION

Figure 1:
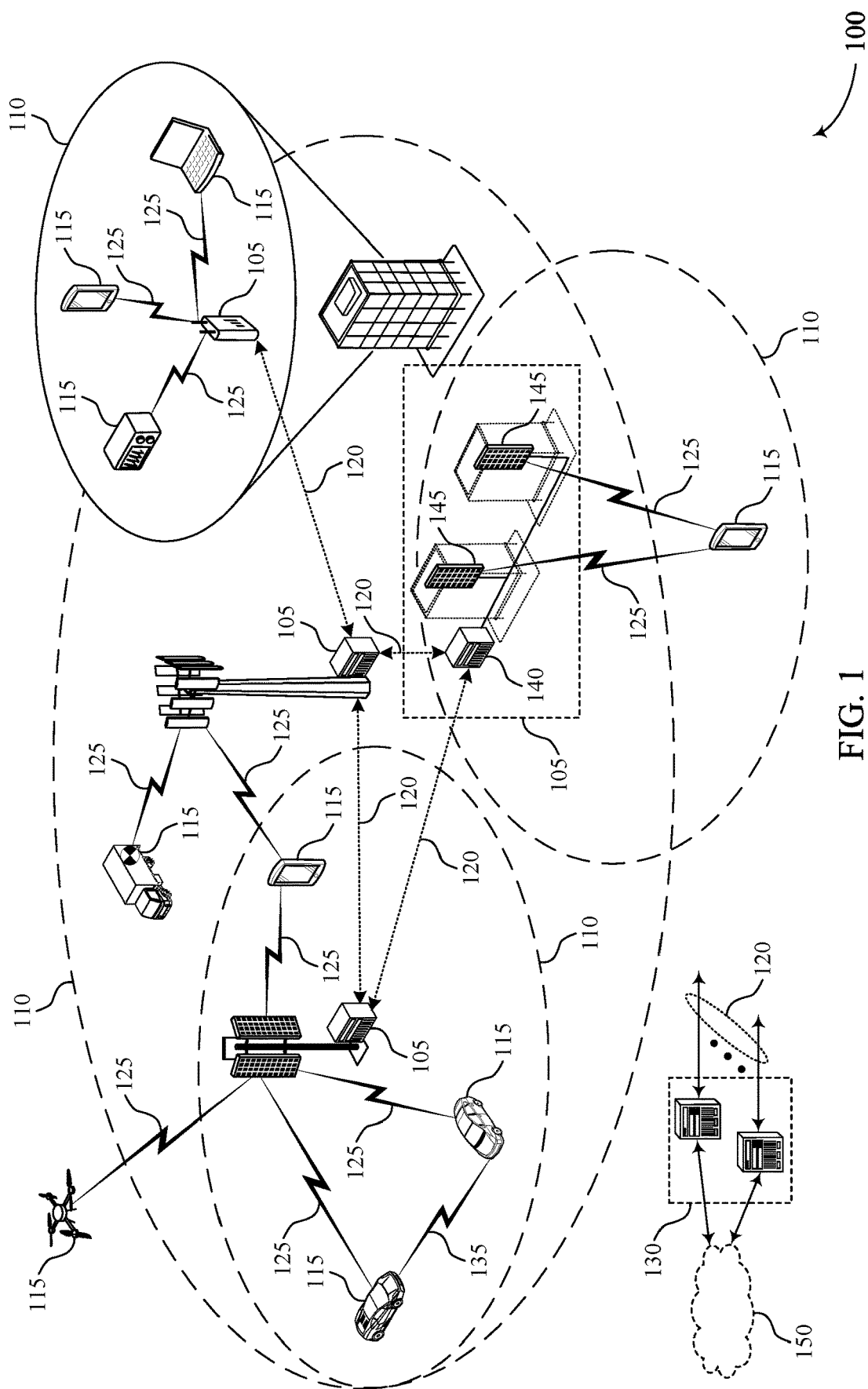
FIGS. 1 and 2 illustrate examples of a wireless communications system that supports packet duplication carrier enhancements in accordance with aspects of the present disclosure.

Some communication devices, which may be otherwise known as a user equipment (UE) may support multiple radio access technologies, for example, such as fourth generation (4G) systems, fifth generation (5G) systems, and the like. Some communication devices may have multi-connectivity capabilities (e.g., dual-connectivity), which may allow the communication devices to be served by multiple base stations, operating on same or different radio access technologies. In some examples, some communication devices may support low latency and high reliability applications, such as ultra-reliable low latency communications (uRLLC). To support applications having low latency and high reliability requirements, communication devices may improve packet processing (e.g., transmission, reception) across protocol stacks. For example, some communication devices may duplicate and transmit in parallel multiple copies of a packet across multiple carriers via carrier aggregation, or over multiple base stations, for example, a primary base station and a secondary base station. The packet duplication may therefore support a seamless redundancy that improves reliability, as well as reduces latency in wireless communication by eliminating retransmission of packets.

In some examples, some communication devices may operate in an unlicensed radio frequency spectrum or a frequency range 2 (FR2) for uRLLC. Communication devices operating in the unlicensed radio frequency spectrum or the FR2 may use contention-based protocols prior to packet transmissions. Due to the contention-based aspect, communication devices may configure additional carriers when transmitting in parallel multiple copies of a packet across multiple carriers. For example, due to possible negative contention-based outcomes, communication devices may configure extra carriers for packet transmission (e.g., more carriers than a number of copies of a packet). However, when all configured carriers transmit continuously (e.g., even when all carriers are available), communication devices may experience poor usage of resources (i.e., wasted resources), extra power consumption, and in some examples, added uplink interference. Therefore, as demand for communication efficiency increases, some communication devices may lack capabilities to support higher reliability for packet transmissions while improving resource usage and reducing interference between packet transmissions.

A communication device, for example, such as a UE may receive an uplink packet duplication configuration that indicates a set of configured carriers and a number of copies of an uplink packet to transmit. The communication device may select a subset of the set of configured carriers based on a selection criterion and the number of copies of the uplink packet to transmit. In some examples, the selection criterion may include a signal strength metric (e.g., a layer 1 (L1) reference signal received power (RSRP)), an exposure metric (e.g., a maximum permissible exposure (MPE)), a result of a clear channel assessment (CCA) procedure, and the like. As a result, the communication device may transmit an uplink packet transmission including the copy of the uplink packet on each carrier of the subset of the set of configured carriers based on the uplink packet duplication configuration.

Accordingly, communication devices may support higher reliability for packet transmissions according to an uplink packet duplication configuration and one or more criterions. In some examples, communication devices may drop transmission or retransmission of other copies of an uplink packet based on a determination that a sufficient number of copies of the uplink packet have been transmitted reliably (e.g., after a listen-before-talk (LBT) success). In some examples, a network (e.g., a base station) may configure a number of carriers (e.g., three carriers) with configured grants for transmission of copies of an uplink packet, as well as configure communication devices to transmit at least a subset of the number of copies (e.g., at least two copies). The communication devices may, in some examples, not attempt to transmit on additional carriers (e.g., the third carrier) based on determining that two copies have been transmitted reliably.

Additionally or alternatively, communication devices may consider FR2 metrics as one criterion for uplink packet duplication. In some examples, communication devices may consider L1 RSRP per directional beam when carrying out uplink packet duplication. For example, based on determining a high L1 RSRP on a carrier used for transmission of a copy of an uplink packet, communication devices may determine to transmit fewer copies on other carriers. in some examples, communication devices may measure L1 RSRP based on a synchronization signal block (SSB) or a channel state information reference signal (CSI-RS). The communication devices may also assume beam correspondence between downlink directional beams and uplink directional beams (e.g., that downlink beam reflects quality of an uplink beam). In some examples, communication devices may consider FR2 metrics, such as MPE when electing carriers use for uplink packet duplication. For example, based on detecting that an exposure is crossing an MPE, communication devices may transmit on all carriers or on fewer carriers. Thus, communication devices may support higher reliability for packet transmissions according to an uplink packet duplication configuration and one or more criterions.

Particular aspects of the subject matter described herein may be implemented to realize one or more advantages. The described techniques may support improvements in power savings, among other advantages. As such, supported techniques may include improved UE operations and, in some examples, may promote UE efficiencies, among other benefits. Aspects of the disclosure are initially described in the context of a wireless communications system. Aspects of the disclosure are then illustrated by and described with reference to protocol architectures and process flow that relate to packet duplication carrier enhancements. Aspects of the disclosure are further illustrated by and described with reference to apparatus diagrams, system diagrams, and flowcharts that relate to packet duplication carrier enhancements.

FIG. 1 illustrates an example of a wireless communications system 100 that supports packet duplication carrier enhancements in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

UEs 115 may receive an uplink packet duplication configuration that indicates a set of configured carriers and a number of copies of an uplink packet to transmit. UEs 115 may select a subset of the set of configured carriers based on a selection criterion and the number of copies of the uplink packet to transmit. In some examples, the selection criterion may include a signal strength metric (e.g., L1 RSRP), an exposure metric (e.g., an MPE), a result of a CCA procedure, and the like. As a result, UEs 115 may transmit an uplink packet transmission including the copy of the uplink packet on each carrier of the subset of the set of configured carriers based on the uplink packet duplication configuration. In some examples, base stations 105 may transmit to UEs 115 an uplink packet duplication configuration that indicates a set of configured carriers and a number of copies of an uplink packet to transmit. Base stations 105 may, in some examples, select a subset of the set of configured carriers based on a selection criterion and the number of copies of the uplink packet to transmit. Thus, base stations 105 may monitor for an uplink packet transmission including the copy of the uplink packet via each carrier of the subset of the set of configured carriers based on the uplink packet duplication configuration.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support uRLLC or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal to noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low SNR conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
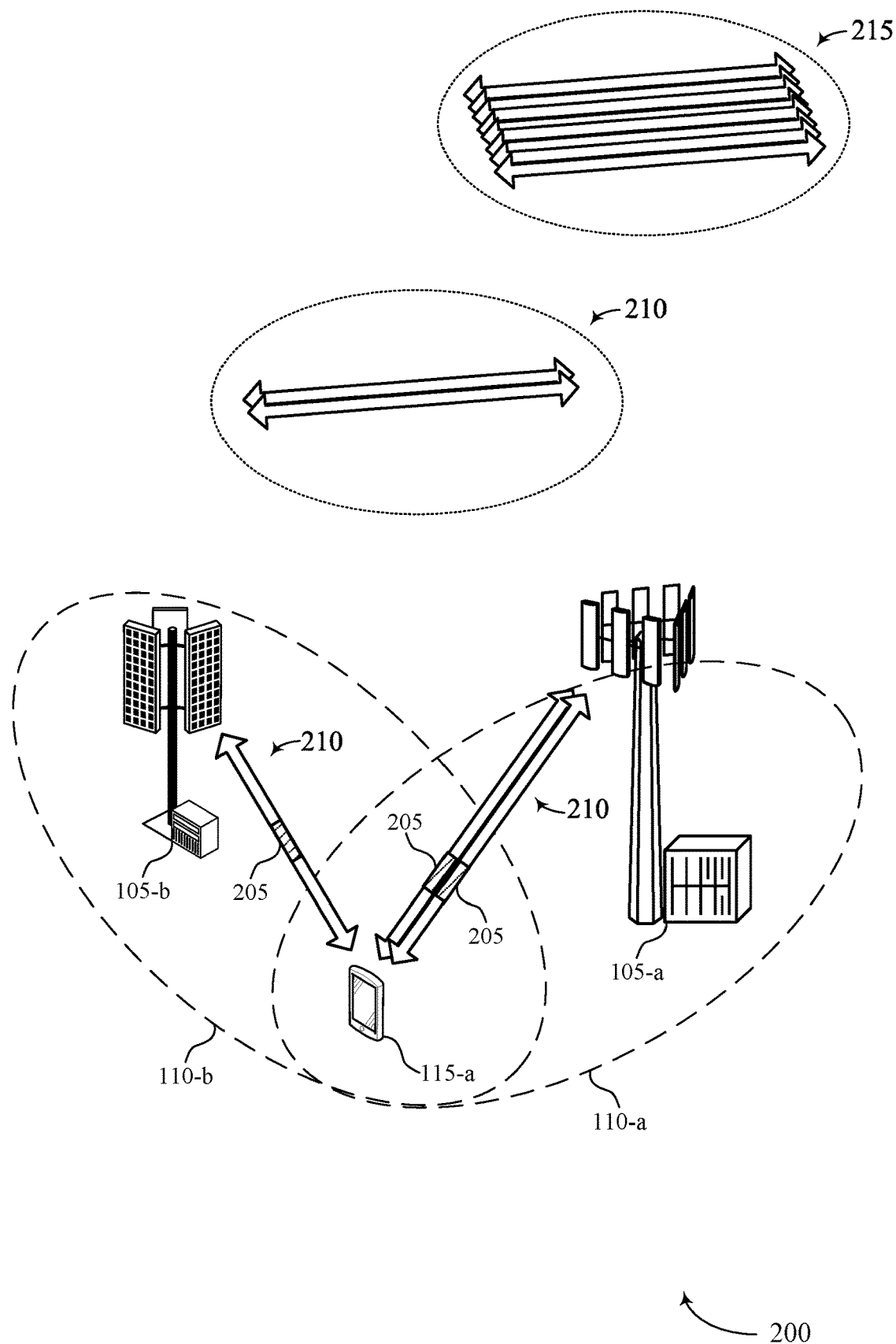

FIG. 2 illustrates an example of a wireless communications system 200 that supports packet duplication carrier enhancements in accordance with aspects of the present disclosure. In some examples, the wireless communications system 200 may implement aspects of the wireless communications system 100. For example, the wireless communications system 200 may include UE 115-a and multiple base stations 105, such as base station 105-a and base station 105-b, which may be examples of the corresponding devices described with reference to FIG. 1. In some examples, the wireless communications system 200 may support multiple radio access technologies, such as 4G systems, 5G systems, and the like. In the example that the wireless communications system 200 supports multiple radio access technologies, UE 115-a may have multi-connectivity capabilities, which may allow UE 115-a to be served by multiple base stations, operating on same or different radio access technologies (e.g., carrier frequencies). For example, base station 105-a may be a primary base station (also referred to as a master gNB (MgNB)) with a coverage area 110-a, while base station 105-b may be a secondary base station (also referred to as a secondary gNB (SgNB)) with a coverage area 110-b.

UE 115-a may duplicate and transmit in parallel multiple copies of uplink packet 205 across multiple carriers (e.g., via carrier aggregation) or over multiple base stations 105, for example, base station 105-a and base station 105-b. UE 115-a may, additionally or alternatively, support beamforming to shape or steer a directional beam (e.g., a transmit beam, a receive beam) along a spatial path between UE 115-a and base station 105-a, base station 105-b, or both to transmit in parallel multiple copies of uplink packet 205 across multiple carriers (e.g., via carrier aggregation) on a directional beam. UE 115-a may, in some examples, use beam sweeping techniques as part of beam forming operations. For example, UE 115-a may use multiple antennas or antenna arrays to conduct beamforming operations for directional communications with base station 105-a, base station 105-b, or both. UE 115-a may transmit uplink packets 205 in a single beam direction or multiple beam directions (e.g., a direction associated with base station 105-a, base station 105-b, or both).

In some examples, UE 115-a may support low latency and high reliability applications, such as uRLLC. To support applications having low latency and high reliability requirements, the wireless communications system 200 may enable UE 115-a to improve uplink packet 205 processing (e.g., transmission, reception) across protocol stacks (e.g., user plane and control plane protocols). The uplink packet duplication may therefore provide a seamless redundancy that improves reliability, as well as reduces latency in wireless communication by eliminating retransmission of uplink packets 205. Example of a protocol architecture is further described in more detail herein with reference to FIG. 3.

Figure 3:
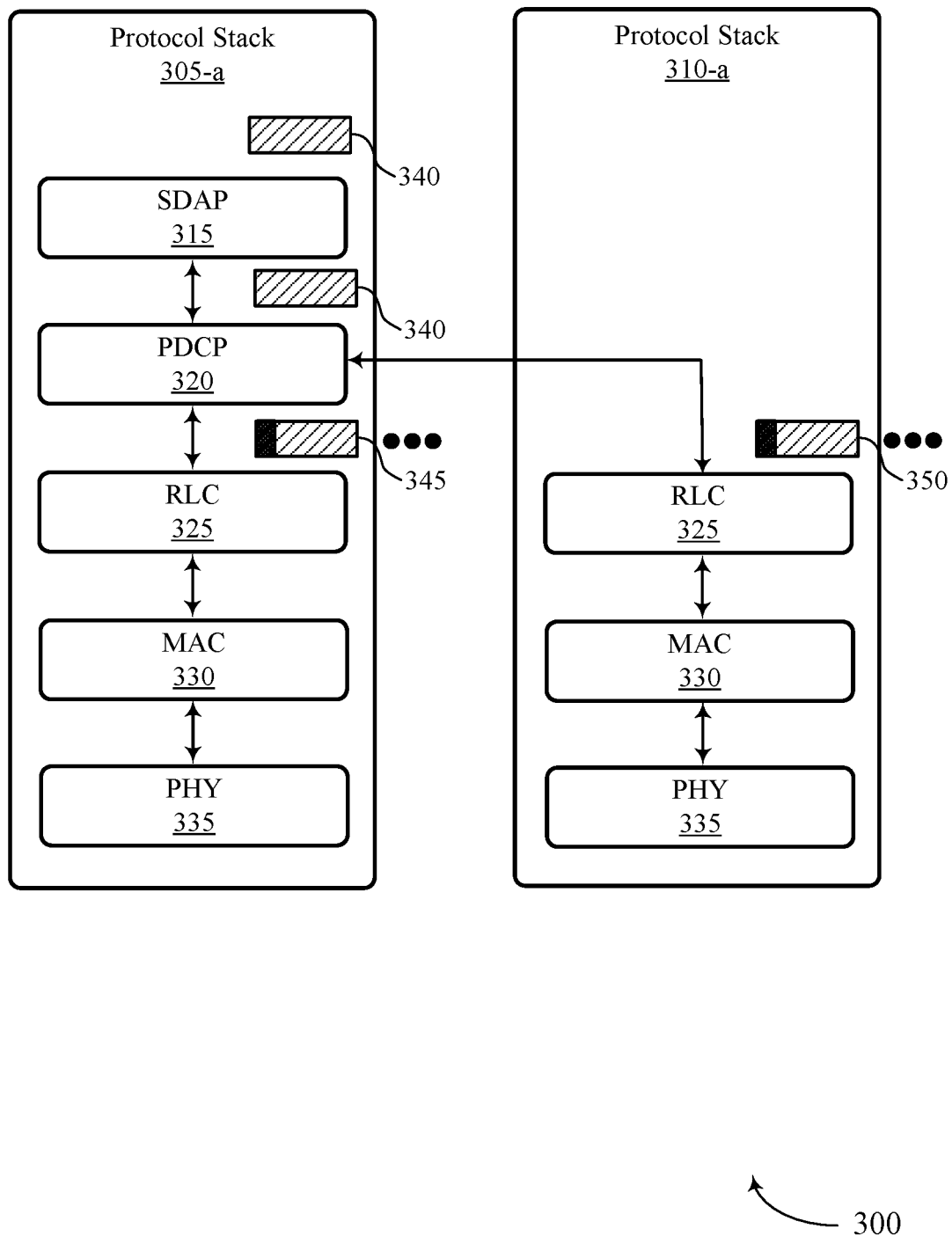
FIGS. 3 and 4 illustrate examples of a protocol architecture that supports packet duplication carrier enhancements in accordance with aspects of the present disclosure.

FIG. 3 illustrates an example of a protocol architecture 300 that supports packet duplication carrier enhancements in accordance with aspects of the present disclosure. The protocol architecture 300 may include protocol stack 305-a and protocol stack 305-b, which may include multiple protocol entities that may be common to both user and control planes in protocol stack 305-a, protocol stack 305-b, or both. In some examples, the protocol architecture 300 may implement aspects of wireless communications systems 100 and 200, as described with reference to FIGS. 1 and 2. For example, the protocol architecture 300 may support packet duplication, and more particularly PDCP duplication with dual-connectivity using split bearer. For example, with reference to FIG. 2, UE 115-a may use protocol stack 305-a for packet transmission to base station 105-a and protocol stack 305-b for packet transmission to base station 105-b. The protocol architecture 300 may therefore support packet duplication based on a configuration by a base station 105, and implemented by a UE 115 to experience reduced power consumption, improved reliability for packet transmissions, increased spectral efficiency, higher data rates and, in some examples, low latency for wireless communications, among other benefits.

Protocol stack 305-a may include a service data adaptation protocol (SDAP) layer 315, a PDCP layer 320, a radio link control (RLC) layer 325, a medium access control (MAC) layer 330, and a physical (PHY) layer 335. Protocol stack 305-b may include similar protocol entities. For example, protocol stack 305-a may also include an RLC layer 325, a MAC layer 330, and a PHY layer 335. The multiple protocol entities may be in communication with one another via one or more radio bearers, logical channels, transport channels. For example, SDAP layer 315 and PDCP layer 320 may be in communication with RLC layer 325 via one or more radio bearers, RLC layer 325 may be in communication with MAC layer 330 via one or more logical channels, and MAC layer 330 may be in communication with PHY layer 335 via one or more transport channels. Radio bearers may include signaling radio bearers (SRB), such as SRB0, SRB1, SRB2, SRB3, etc. Examples of logical channels include broadcast control channel (BCCH), paging control channel (PCCH), common control channel (CCCH), dedicated control channel (DCCH), dedicated traffic channel (DTCH), multicast traffic channel (MCH), or multicast control channel (MCCH). Examples of transport channels include uplink shared channel (UL-SCH), downlink shared channel (DL-SCH), paging channel (PCH), broadcast channel (BCH), and random access channel (RACH).

SDAP layer 315 may support and perform various functions, for example, mapping between a quality-of-service (QoS) flow and a data radio bearer, as well as assign QoS flow identifiers to uplink packets. In some examples, SDAP layer 315 may receive uplink packet 340 and may assign uplink packet 340 to a QoS flow and a set of radio bearers to ensure that uplink packet 340 receives the correct forwarding treatment as it traverses the protocol stack 305-*a*, protocol stack 305-*b*, or both. For example, SDAP layer 315 may forward uplink packet 340 to PDCP layer 320 according to the assigned QoS flow and the set of radio bearers. Uplink packet 340 may be a PDCP service data unit (SDU).

PDCP layer 320 may support and perform various functions, such as transfer of user data, header compression, sequence numbering, duplication detection, packet duplication, and the like. In some examples, PDCP layer 320 may receive uplink packet 340 (e.g., PDCP SDU) and may perform header compression followed by ciphering. In some examples, PDCP layer 320 may add a PDCP header carrying information for deciphering uplink packet 340. In the example of packet duplication, PDCP layer 320 may perform packet duplication on uplink packet 340 (e.g., PDCP PDU), also referred to as "PDCP duplication." As a result, PDCP layer 320 may generate uplink packets 345, 350 that may be entirely or partially equivalent (e.g., difference in radio bearer identifiers, logical channel identifiers). For example, uplink packet 345 may be associated with a radio bearer and logical channel different from uplink packet 350. In some examples, PDCP layer 320 perform packet duplication on uplink packet 340 based on an uplink packet duplication configuration, which may be an uplink PDCP duplication configuration. In some examples, PDCP layer 320 may perform packet duplication to generate a number of copies of uplink packet 340. The number of copies may be a minimum or maximum number of copies of uplink packet 340 to transmit.

PDCP layer 320 may forward uplink packet 345 to RLC layer 325 in protocol stack 305-*a* and forward uplink packet 350 to RLC layer 325 in protocol stack 305-*b*. In this example, PDCP duplication may include sending more than one copy of a same PDCP PDU to lower layers (e.g., RLC layers), by sending each copy to a different RLC entity. A base station 105 may configure RLC layers 325 (e.g., of a UE 115) for sending copies of uplink packet 340 (i.e., uplink packets 345, 350). In some examples, each RLC layer 325 may have one or more logical channel associated with one or more serving cells or carriers via a logical channel mapping criteria. Each RLC layer 325 may assemble uplink packets 345, 350 (e.g., RLC SDUs) received from a corresponding PDCP layer 320 into further groups of one or more packets (e.g., RLC PDUs), and may pass the groups of packets to a corresponding MAC layer 330.

The MAC layer 330 may perform logical channel prioritization, and may assemble the groups of one or more packets (e.g., MAC SDUs) received from the RLC layers 325 into MAC PDUs (i.e., transport blocks (TBs)) that are passed to a lower layer (e.g., PHY layer 335) for transmission over a wireless interface. For example, uplink packets 345, 350 may be transmitted in parallel across multiple carriers (e.g., via carrier aggregation) or over multiple base stations 105 that each may or may not use carrier aggregation. In some examples, additionally or alternatively, uplink packets 345, 350 may be transmitted in parallel across multiple carriers on a directional beam. Protocol architecture 300 may therefore support PDCP duplication with dual-connectivity using split bearer. Example of another protocol architecture is further described in more detail with reference to FIG. 4.

Figure 4:
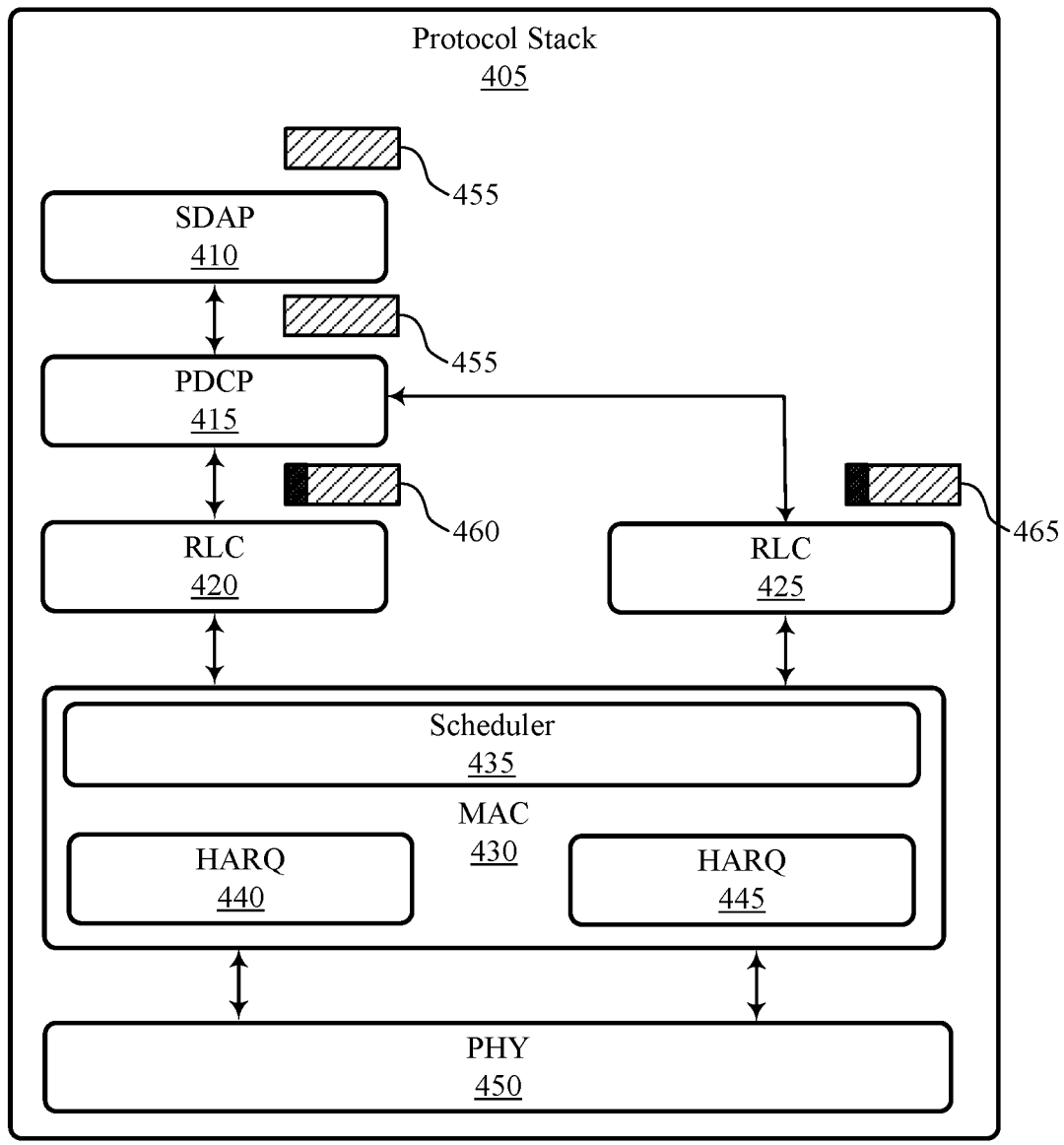

FIG. 4 illustrates an example of a protocol architecture 400 that supports packet duplication carrier enhancements in accordance with aspects of the present disclosure. The protocol architecture 400 may include a protocol stack 405, which may include multiple protocol entities common to both user and control planes in protocol stack 405. In some examples, the protocol architecture 400 may implement aspects of wireless communications systems 100 and 200, as described with reference to FIGS. 1 and 2. For example, the protocol architecture 300 may support packet duplication, and more particularly PDCP duplication with carrier aggregation. For example, with reference to FIG. 2, UE 115-*a* may use protocol stack 405 for transmission of multiple copies of a packet to base station 105-*a* via carrier aggregation. The protocol architecture 400 may therefore support packet duplication based on a configuration by a base station 105, and implemented by a UE 115 to experience reduced power consumption, improved reliability for packet transmissions, increased spectral efficiency, higher data rates and, in some examples, low latency for wireless communications, among other benefits.

Protocol stack 405 may include an SDAP layer 410, a PDCP layer 415, an RLC layer 420, a MAC layer 430, and a PHY layer 450. The multiple protocol entities may be in communication with one another via one or more radio bearers, logical channels, transport channels. For example, SDAP layer 410 and PDCP layer 415 may be in communication with RLC layers 420, 425 via one or more radio bearers, RLC layers 420, 425 may be in communication with MAC layer 430 via one or more logical channels, and MAC layer 430 may be in communication with PHY layer 450 via one or more transport channels. Radio bearers, logical channels, and transport channels may include one or more examples of radio bearers as described with reference to FIGS. 1 through 3.

SDAP layer 410 may support and perform various functions, for example, mapping between a QoS flow and a data radio bearer, as well as assign QoS flow identifiers to uplink packets. In some examples, SDAP layer 410 may receive uplink packet 455 and may assign uplink packet 455 to a QoS flow and a set of radio bearers to ensure that uplink packet 455 receives the correct forwarding treatment as it traverses protocol stack 405. For example, SDAP layer 410 may forward uplink packet 455 (e.g., PDCP SDU) to PDCP layer 415 according to the assigned QoS flow and the set of radio bearers.

PDCP layer 415 may support and perform various functions, such as transfer of user data, header compression, sequence numbering, duplication detection, packet duplication, and the like. In some examples, PDCP layer 415 may receive uplink packet 455 (e.g., PDCP SDU) and may perform header compression followed by ciphering. In some examples, PDCP layer 415 may add a PDCP header carrying information for deciphering uplink packet 455. In the example of packet duplication, PDCP layer 415 may perform packet duplication on uplink packet 455 (e.g., PDCP PDU). As a result, PDCP layer 415 may generate uplink packets 460, 465 that may be entirely or partially equivalent. In some examples, PDCP layer 415 perform packet duplication on uplink packet 455 based on an uplink packet duplication configuration, which may be an uplink PDCP duplication configuration. In some examples, PDCP layer 415 may perform packet duplication to generate a number of copies of uplink packet 455. The number of copies may be a minimum or maximum number of copies of uplink packet 455 to transmit.

PDCP layer 415 may forward uplink packet 460 to RLC layer 420 and uplink packet 465 to RLC layer 425. In this example, PDCP duplication may include sending more than one copy of a same PDCP PDU to lower layers (e.g., RLC layers), by sending each copy to a different RLC layer. A base station 105 may configure RLC layers 420, 425 (e.g., of a UE 115) for sending copies of uplink packet 455 (i.e., uplink packets 460, 465). In some examples, each RLC layer 420, 425 may have one or more logical channel associated with one or more serving cells or carriers via a logical channel mapping criteria. Each RLC layer 420, 425 may assemble uplink packets 460, 465 (e.g., RLC SDUs) received from PDCP layer 415 into further groups of one or more packets (e.g., RLC PDUs), and may pass the groups of packets to MAC layer 430.

MAC layer 430 may perform logical channel prioritization, and may assemble the groups of one or more packets (e.g., MAC SDUs) received from RLC layers 420, 425 into MAC PDUs (i.e., TBs) that are passed to a lower layer (e.g., PHY layer 450) for transmission over a wireless interface. In some examples, MAC layer 430 may include a scheduler 435 that may support and perform various functions, such as resource allocation and handling sharing available time and frequency resources (e.g., RBs) among different carriers that may carry uplink packets 460, 465. MAC layer 430 may, additionally or alternatively, include HARQ layers 440, 445 that may support and perform various functions, such as retransmission of uplink packets 460, 465. For example, uplink packets 460, 465 may be transmitted in parallel across multiple carriers (e.g., via carrier aggregation) or over multiple base stations 105. In some examples, additionally or alternatively, uplink packets 460, 465 may be transmitted in parallel across multiple carriers on a directional beam. Protocol architecture 400 may therefore support PDCP duplication with carrier aggregation. That is, protocol architecture 400 may have multiple RLC layers associated with a single base station supporting carrier aggregation, or related to multiple base stations, where some base stations may use or not use carrier aggregation.

With reference to FIG. 2, the wireless communications system 200 may, in some examples, support communication between base station 105-a, base station 105-b, or both and UE 115-a in an unlicensed radio frequency spectrum (also referred to as a shared radio frequency spectrum) or an FR2 for uRLLC. An unlicensed radio frequency spectrum may include 5 GHz unlicensed band, while FR2 may include frequencies greater than 6 GHz (e.g., in a 26 GHz band). UE 115-a may use contention-based protocols to access an unlicensed radio frequency spectrum prior to uplink packet transmissions. Due to the contention-based aspect, UE 115-a may configure additional carriers, in some examples, when transmitting in parallel multiple copies of uplink packets across multiple carriers (e.g., via carrier aggregation). That is, due to possible negative contention-based outcomes, for example, failed LBT procedures, UE 115-a may configure extra carriers for uplink packet transmissions (e.g., more carriers than a number of copies of an uplink packet).

Thus, when up to all configured carriers transmit continuously (e.g., even when all carriers are available), UE 115-a may experience poor usage of resources (i.e., wasted resources), extra power consumption by UE 115-a, and in some examples, added uplink interference. To avoid these challenges, base station 105-a, base station 105-b, or both may enable UE 115-a to control a number of carriers for transmission of uplink packet 205 duplications (e.g., multiple copies of an uplink packet 205) based on a contention-based procedure outcome (e.g., an LBT outcome). Additionally, base station 105-a, base station 105-b, or both may enable UE 115-a to support uplink packet 205 duplications on FR2 carriers based on FR2 specific metrics (e.g., RSRP per directional beam or layer-1 RSRP per directional beam) and FR2 specific criteria (e.g., MPE).

Base station 105-a, 105-b may transmit an uplink packet duplication configuration to UE 115-a, which may enable UE 115-a to efficiently perform uplink packet duplication and transmission. For example, the uplink packet duplication configuration may indicate a set of carriers and a number of copies of uplink packet 205 to transmit to base station 105-a or base station 105-b. In some examples, UE 115-a may select a subset of the carriers 210 from a set of configured carriers 215 on which to transmit a copy of the uplink packet based on a selection criterion and a number of copies of uplink packet 205 to transmit to base station 105-a or base station 105-b. UE 115-a may transmit copies of uplink packets 205 on each carrier of the subset of carriers 210 based on the uplink packet duplication configuration, and may skip transmitting a copy of the uplink packet 205 an any of the carriers not selected to be included in the subset. In some examples, uplink packet 205 transmission may be an initial transmission of uplink packet 205 or a retransmission of uplink packet 205. In some examples, carriers of the subset of carriers 210 may correspond to a shared radio frequency band or an FR2 frequency band.

UE 115-a may, in some examples, receive control signaling that indicates a grant. The grant may include an allocation of time and frequency resources (e.g., physical resource blocks (PRBs)) for transmitting transmit copies of uplink packets 205. For example, UE 115-a may receive control information (e.g., downlink control information (DCI)) including an indication of a grant from base station 105-a or base station 105-b. The grant may be a dynamic grant (e.g., applicable to a current slot or subframe) or a semi-persistent grant (e.g., a grant of resources that occurs periodically or aperiodically for a defined amount of time or until released by the UE 115-a or base station 105-a). UE 115-a may therefore transmit copies of uplink packets 205 on carriers of the subset of carriers 210 based on the grant. The control signaling may, additionally or alternatively, include an indication of a selection criterion.

A carrier of the subset of carriers 210 or of the set of configured carriers 215 may include a portion of a radio frequency spectrum band (e.g., 5 GHz in unlicensed band, or frequencies greater than 6 GHz (e.g., in a 26 GHz band) in an FR2 band) that may be operated according to physical layer channels (e.g., physical downlink control channel (PDCCH), physical uplink control channel (PUSCH)). In some examples, downlink and uplink carriers may be associated with a pre-defined frequency channel. A carrier may be downlink or uplink (e.g., in an FDD mode), or be configured to carry downlink and uplink communications (e.g., in a TDD mode), for example, copies of uplink packets 205.

In some examples, UE 115-a may identify that a selection criterion includes a result of a CCA procedure. For example, UE 115-a may determine and select a number of carriers from the set of configured carriers 215 to include in the subset based on a result of a CCA procedure performed on multiple carriers of the set of configured carriers 215. UE 115-a may include carriers that pass the CCA procedure in the subset of carriers 210, which UE 115-a may use for uplink packet 205 transmission. As such, UE 115-a may determine to transmit a copy of uplink packet 205 on carriers that pass the CCA procedure, but may refrain from transmitting a copy of uplink packet 205 on any carrier that fails the CCA procedure. Base station 105-a, base station 105-b, or both may therefore configure the set of configured carriers 215, and a number of copies of uplink packet 205 that are to be transmitted by UE 115-a. As such, UE 115-a may select a number of carriers from the set of configured carriers 215 and assign the carriers to the subset of carriers 210 based on at least a number of carriers passing the CCA procedure. The selection criterion may, therefore, be the result of the CCA procedure indicating carrier availability. In some examples, UE 115-*a* may determine not to transmit a copy of uplink packet 205 on a carrier of the subset of carriers 210 based on determining that a number of transmissions of the copy of uplink packet 205 satisfies a number of copies of uplink packet 205 to transmit.

Additionally or alternatively, UE 115-*a* may determine not to transmit a copy of uplink packet 205 on any carrier of the configured set of carriers 215 that has a signal strength measurement that does not satisfy a threshold. For example, UE 115-*a* may select carriers and assign them to the subset of carriers 210 based on a signal strength metric generated for each carrier that may include an RSRP metric, a reference signal metric, a channel quality information (CQI) metric, a signal to interference plus noise ratio (SINR) metric, an SNR metric, a rank metric, or any combination thereof.

By way of example, UE 115-*a* may measure an RSRP metric relating to one or more carriers of the set of configured carriers 215 and one or more directional beams (e.g., uplink or downlink beams), and determine that RSRP of one or more carriers and one or more directional beams satisfies an RSRP threshold. As such, UE 115-*a* may select and assign these carriers to the subset of configured carriers 210, and transmit one or more copies of uplink packet 205 on carriers in the subset. In addition, UE 115-*a* may ignore (e.g., not select) and refrain from transmitting one or more copies of uplink packet 205 on carriers of the set of configured carriers 215 and on directional beams that do not satisfy the RSRP threshold (e.g., are above or below the RSRP threshold). Additionally or alternatively, UE 115-*a* may measure an SINR metric or SNR metric relating to one or more carriers of the set of configured carriers 215 and one or more directional beams (e.g., uplink or downlink beams), and determine that an SINR or an SNR of the one or more carriers and one or more directional beams satisfies an SINR threshold or SNR threshold. As such, UE 115-*a* may select and assign these carriers to the subset of configured carriers 210, and transmit one or more copies of uplink packet 205 on carriers in the subset. In addition, UE 115-*a* may ignore (e.g., not select) and refrain from transmitting one or more copies of uplink packet 205 on carriers of the set of configured carriers 215 and directional beams that do not satisfy the SINR or SNR threshold (e.g., are above or below the SINR or SNR threshold).

In some examples, downlink and uplink directional beams between base station 105-*a*, base station 105-*b*, or both and UE 115-*a* may have a full or partial beam correspondence (also referred to as beam reciprocity). For example, a downlink directional beam associated with base station 105-*a*, base station 105-*b*, or both may be paired with an uplink directional beam associated with UE 115-*a*. Additionally, a downlink transmit directional beam associated with base station 105-*a*, base station 105-*b*, or both may be paired with a downlink receive directional beam associated with UE 115-*a*. Similarly, an uplink transmit directional beam associated with UE 115-*a* may be paired with an uplink receive directional beam associated with base station 105-*a*, base station 105-*b*, or both. Thus, in some examples, one or more measurements described above may be performed on a single directional beam of a pair of directional beams, and the measurement result may be valid for both directional beams of the pair. For example, an SINR measurement on an uplink transmit directional beam associated with UE 115-*a* may be applicable to an uplink receive directional beam associated with base station 105-*a* or base station 105-*b*. Thereby, reducing latency related to additional measurements by either or both UE 115-*a* and base station 105-*a*, base station 105-*b*, or both. The above measurements relating to full or partial beam correspondence may also be applicable to LBT procedures by UE 115-*a* and base station 105-*a*, base station 105-*b*, or both.

UE 115-*a* may, in some examples, select carriers from the set of configured carriers 215 and assign these carriers to the subset of carriers 210 based on a carrier order. In some examples, UE 115-*a* may generate a signal strength measurement for each carrier of the set of configured carriers 215, and order the carriers in the set based on the signal measurements. UE 115-*a* may order carriers in the set based on a highest to lowest signal measurement. For example, UE 115-*a* may order carriers in the set of configured carriers 215 based on a highest to lowest RSRP metric, a reference signal metric, channel quality metric, SINR metric, SNR metric, rank metric, or any combination thereof relating to each carrier in the subset or the set. As such, UE 115-*a* may select and assign carriers of the configured set of carriers 215 to the subset of carriers 210 based on the order (e.g., carriers having a highest signal strength measurement).

By way of example, UE 115-*a* may select a number of carriers from the set of configured carriers 215 to include in the subset that have a highest signal strength metric (e.g., pick $N_{min}$ carriers with highest L1-RSRP). In another example, UE 115-*a* may select a number of carriers from the set of configured carriers 215 to include in the subset that have a highest signal strength metric, where the signal strength metric of each selected carrier in the subset satisfies a threshold (e.g., pick $N_{min}$ carriers to include in the subset with highest L1-RSRP, where each selected carrier in the subset has L1-RSRP above a threshold). In another example, UE 115-*a* may select a number of carriers from the set of configured carriers 215 that have a successful LBT and a highest signal strength metric (e.g., pick $N_{min}$ carriers to include in the subset with successful LBT with highest L1-RSRP). In some examples, UE 115-*a* may select a number of carriers from the set of configured carriers 215 that have a successful LBT and a highest signal strength metric where the signal strength metric for each selected carrier satisfies a threshold (e.g., pick $N_{min}$ carriers with successful LBT with highest L1-RSRP, where each carrier has L1-RSRP above a threshold). In some examples, the signal strength measurement described above relating to an RSRP metric, a reference signal metric, channel quality metric, SINR metric, SNR metric, rank metric, or any combination thereof may correspond to one or more downlink directional beams from base station 105-*a*, base station 105-*b*, or both and one or more uplink directional beams of UE 115-*a*. The directional beams may correspond to carriers.

In some examples, UE 115-*a* may identify that a selection criterion includes an exposure metric. For example, UE 115-*a* may select a number of carriers the set of configured carriers 215 and assign the carriers to the subset of carriers 210 based on an exposure metric. In some examples, UE 115-*a* may determine to transmit on the number of carriers of the subset of carriers 210 based on detecting an exposure crossing an exposure threshold (e.g., a permissible exposure threshold). UE 115-*a* may, additionally or alternatively, determine a number of carriers to include in the subset of carriers 210 based on detecting exposure crossing an exposure threshold. For example, based on detecting that an exposure is crossing an MPE, UE 115-*a* may transmit on all carriers or on fewer carriers, for example, the subset of carriers 210.

The wireless communications system 200 may therefore realize one or more advantages. The described techniques in the wireless communications system 200 may support improvements in power savings, among other advantages. As such, supported techniques may include improved UE 115-a operations and, in some examples, may promote UE 115-a efficiencies, UE 115-a coverage, among other benefits. For example, UE 115-a may experience higher reliability for uplink packet 205 copy transmissions according to an uplink packet duplication configuration and one or more selection criterions.

Figure 5:
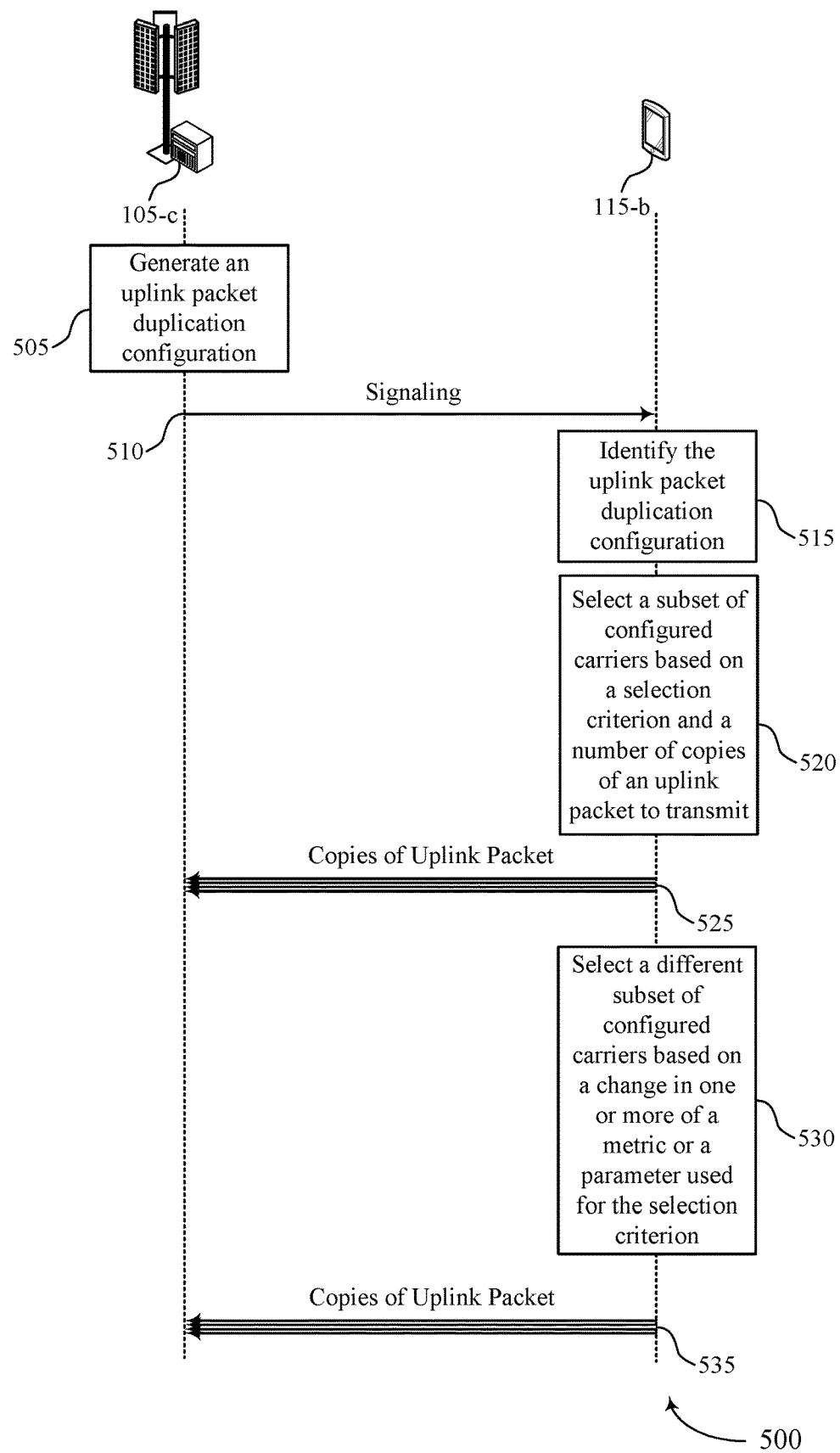
FIG. 5 illustrates an example of a process flow that supports packet duplication carrier enhancements in accordance with aspects of the present disclosure.

FIG. 5 illustrates an example of a process flow 500 that supports packet duplication carrier enhancements in accordance with aspects of the present disclosure. The process flow 500 may implement aspects of the wireless communications systems 100 and 200, as described with reference to FIGS. 1 and 2. For example, the process flow 500 may be based on a configuration by a base station 105 or a UE 115, and implemented by the UE 115 for reduced power consumption, improved reliability for packet transmissions and, in some examples, may low latency communications, among other benefits.

The process flow 500 may include base station 105-c and UE 115-b which may be examples of base stations 105 and UEs 115 as described with reference to FIGS. 1 and 2. In the following description of the process flow 500, the operations between base station 105-c and UE 115-b may be transmitted in a different order than the example order shown, or the operations performed by base station 105-c and UE 115-b may be performed in different orders or at different times. Some operations may also be omitted from the process flow 500, and other operations may be added to the process flow 500.

At 505, base station 105-c may generate an uplink packet duplication configuration. The uplink packet duplication configuration may include an indication of a number of configured carriers and a number of copies of an uplink packet to transmit. At 510, base station 105-c may transmit signaling to UE 115-b that may include the uplink packet duplication configuration. The signaling may include control signaling, for example, such as DCI. Alternatively or additionally, the signaling may include dedicated signaling, for example, such as RRC signaling (e.g., RRC messages). Alternatively, the signaling may include one or more of a MAC control element, a NAS message or a message from a security management function (SMF).

At 515, UE 115-b may receive and identify the uplink packet duplication configuration. At 520, UE 115-b may select a subset of configured carriers based on a selection criterion and a number of copies of an uplink packet to transmit. For example, UE 115-b may select the subset of the configured carriers based on a result of a CCA procedure performed on at least one carrier of the number of configured carriers. As such, the selection criterion may be the result of the CCA procedure. Examples of other selection criterion may include signal strength measurement metric (e.g., RSRP metric, a reference signal metric, a channel quality metric, a SINR metric, SNR metric, a rank metric, or any combination thereof), an exposure metric, and the like. By way of example, UE 115-b may select a number of carriers ($N_{min}$) with a highest L1-RSRP for an uplink packet transmission, or select a number of carriers ($N_{min}$) with a highest L1-RSRP for an uplink packet transmission, where each carrier has an L1-RSRP above a threshold. In some examples, UE 115-b may select a number of carriers ($N_{min}$) with a successful LBT and a highest L1-RSRP for an uplink packet transmission. In some other examples, UE 115-b may select a number of carriers ($N_{min}$) with a successful LBT and a highest L1-RSRP, where each carrier has an L1-RSRP above a threshold, for an uplink packet transmission. In some examples, UE 115-b may not select carriers that have an L1-RSRP below a threshold. At 525, UE 115-b may transmit an uplink packet transmission including copies of the uplink packet on each carrier in the subset of the configured carriers based on the uplink packet duplication configuration.

At 530, UE 115-b may select a different subset of configured carriers based on a change in one or more of a metric or a parameter used for the selection criterion. For example, UE 115-b may determine that a CCA for one of the previously selected carriers may no longer indicate that the carrier is clear and a new carrier may be used for uplink packet transmissions. UE 115-b may therefore select a different subset of configured carriers according to one or more selection criterions as outlined above. At 535, UE 115-b may transmit an uplink packet transmission including copies of the uplink packet on each carrier in the different subset of the configured carriers based on the uplink packet duplication configuration.

The base station 105-c may monitor one or more of the configured carriers for the uplink packet. In some examples, the base station 105-c may perform an estimate CCA procedure to predict which of the configured carriers the UE 115-b may select to include in the subset, and may monitor that subset of the configured carriers for a transmission from the UE 115-b of the copy of uplink packet. In some cases, the UE 115-b may transmit a reference signal (e.g., a demodulation reference signal, a sounding reference signal, etc.) that the base station 105-c may use to generate a signal strength metric, and may use the signal strength metric for selecting which one or more carriers to include in the subset in a similar manner to the discussion provided herein. The base station 105-c may skip monitoring of one or more carriers not included in the subset. The base station 105-c may receive the uplink packet on one or more of the carriers in the subset. In some examples, the base station 105-c may transmit an acknowledgement to the UE 115-b if able to successfully decode one or more copies of the uplink packet, and may transmit a negative acknowledgement to the UE 115-b if unable to successfully decode one or more copies of the uplink packet.

The process flow 500 may therefore realize one or more advantages. The described techniques in the process flow 500 may support improvements in power savings, among other advantages. As such, supported techniques may include improved UE 115-b operations and, in some examples, may promote UE 115-b efficiencies, UE 115-b coverage, among other benefits. For example, UE 115-b may experience higher reliability for uplink packet copy transmissions according to an uplink packet duplication configuration and one or more selection criterions.

Figure 6:
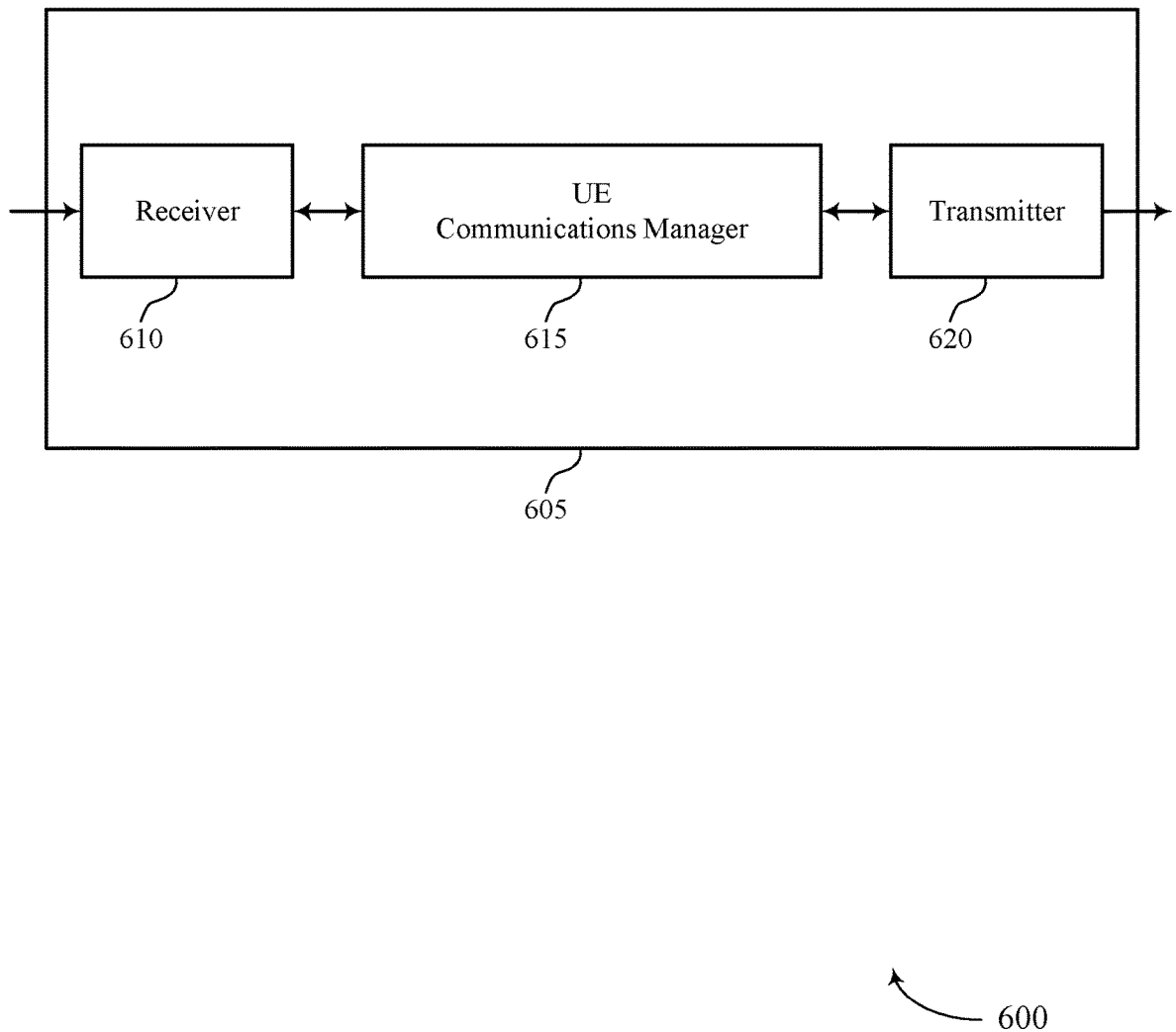
FIGS. 6 and 7 show block diagrams of devices that support packet duplication carrier enhancements in accordance with aspects of the present disclosure.

FIG. 6 shows a block diagram 600 of a device 605 that supports packet duplication carrier enhancements in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to packet duplication carrier enhancements, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive an uplink packet duplication configuration that indicates a set of configured carriers and a number of copies of an uplink packet to transmit, select a subset of the set of configured carriers based on a selection criterion and the number of copies of the uplink packet to transmit, and transmit an uplink packet transmission including the copy of the uplink packet on each carrier of the subset of the set of configured carriers based on the uplink packet duplication configuration. The UE communications manager 615 may be an example of aspects of the UE communications manager 910 described herein.

The actions performed by the communications manager 615 as described herein may be implemented to realize one or more potential advantages. One implementation may enable a UE to receive an uplink packet duplication configuration that indicates a set of configured carriers and a number of copies of the uplink packet to transmit. Such indications may enable techniques for efficiently transmitting packets, which may result in improved resource usage and more efficient communications (e.g., reduced interference in the system), among other advantages.

Based on implementing the indications as described herein, a processor of a UE or base station (e.g., a processor controlling the receiver 610, the communications manager 615, the transmitter 620, or a combination thereof) may select a subset of configured carriers for packet transmission while ensuring relatively efficient communications. For example, the uplink packet duplication configuration as described herein may leverage selection criterion and the number of copies of the uplink packet to determine whether to transmit the uplink packet, which may realize improved reliability for packet transmissions and power savings, among other benefits.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
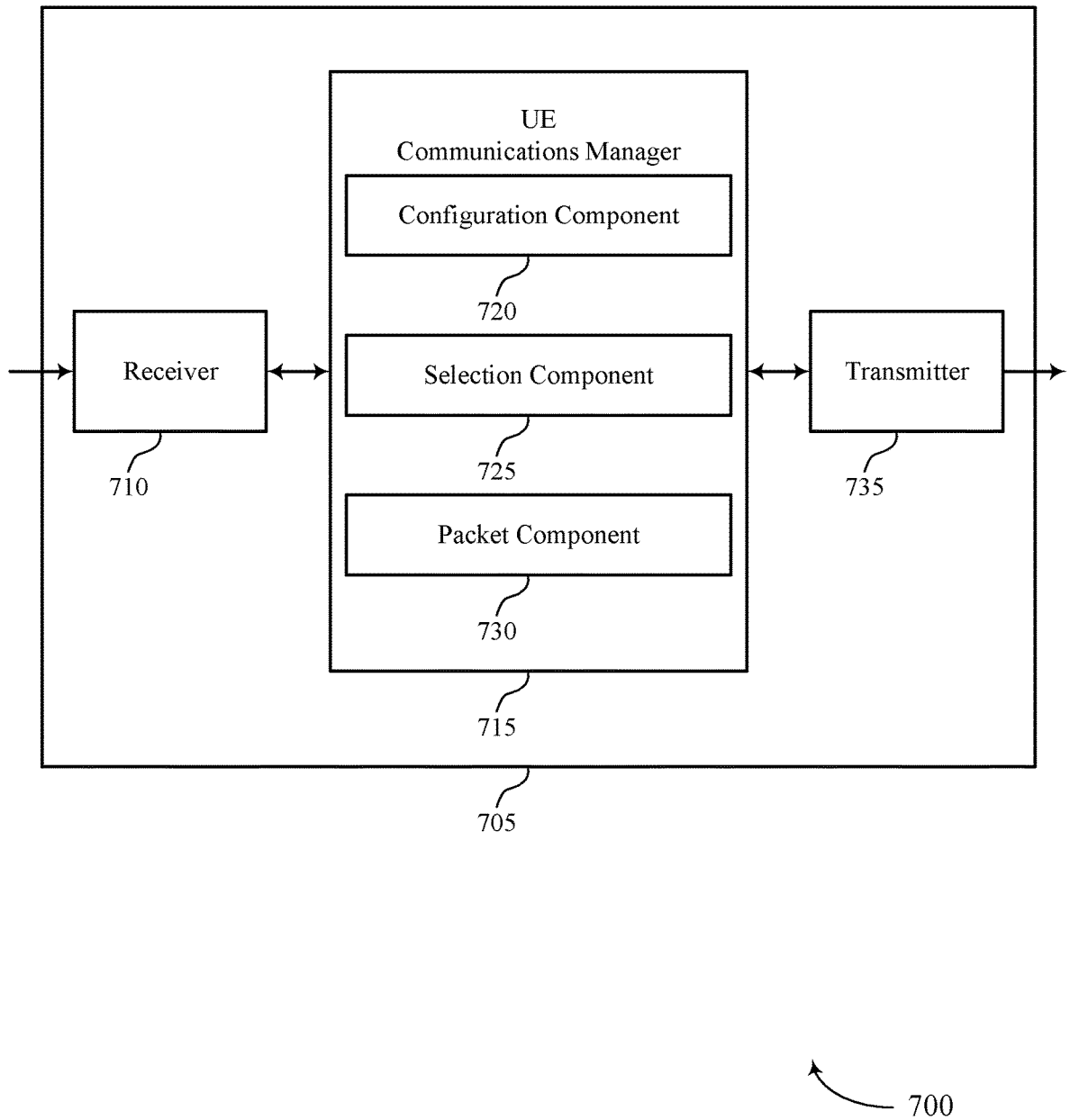

FIG. 7 shows a block diagram 700 of a device 705 that supports packet duplication carrier enhancements in accordance with aspects of the present disclosure. The device 705 may be an example of aspects of a device 605, or a UE 115 as described herein. The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to packet duplication carrier enhancements, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a configuration component 720, a selection component 725, and a packet component 730. The UE communications manager 715 may be an example of aspects of the UE communications manager 910 described herein.

The configuration component 720 may receive an uplink packet duplication configuration that indicates a set of configured carriers and a number of copies of an uplink packet to transmit. The selection component 725 may select a subset of the set of configured carriers based on a selection criterion and the number of copies of the uplink packet to transmit. The packet component 730 may transmit an uplink packet transmission including the copy of the uplink packet on each carrier of the subset of the set of configured carriers based on the uplink packet duplication configuration.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
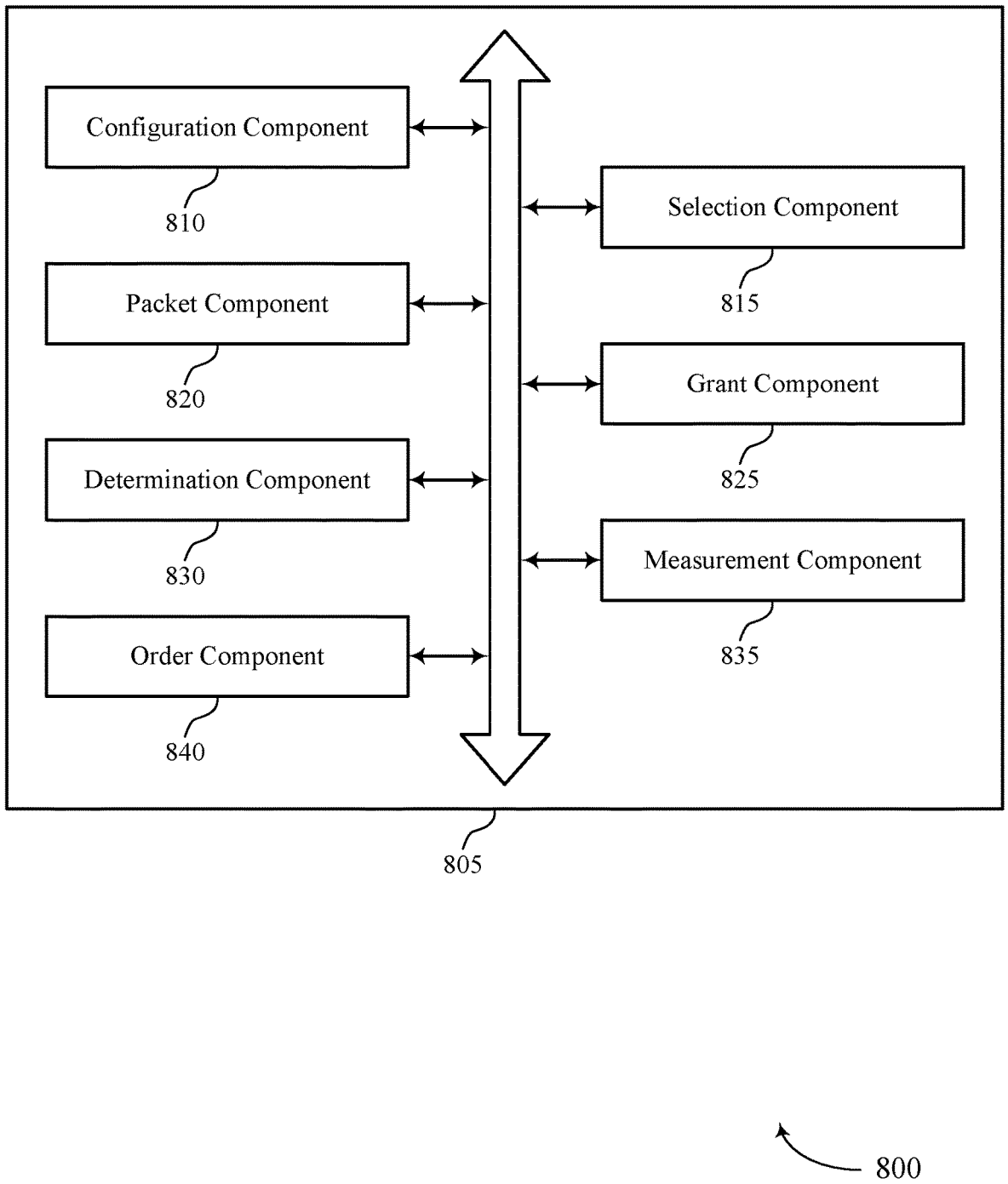
FIG. 8 shows a block diagram of a communications manager that supports packet duplication carrier enhancements in accordance with aspects of the present disclosure.

FIG. 8 shows a block diagram 800 of a UE communications manager 805 that supports packet duplication carrier enhancements in accordance with aspects of the present disclosure. The UE communications manager 805 may be an example of aspects of a UE communications manager 615, a UE communications manager 715, or a UE communications manager 910 described herein. The UE communications manager 805 may include a configuration component 810, a selection component 815, a packet component 820, a grant component 825, a determination component 830, a measurement component 835, and an order component 840. Each of these modules may communicate, directly or indirectly, with one another (e.g., via one or more buses).

The configuration component 810 may receive an uplink packet duplication configuration that indicates a set of configured carriers and a number of copies of an uplink packet to transmit. In some examples, the configuration component 810 may receive signaling that indicates the selection criterion. In some cases, the uplink packet duplication configuration indicates the selection criterion. In some cases, the uplink packet duplication configuration is an uplink PDCP duplication configuration.

The selection component 815 may select a subset of the set of configured carriers based on a selection criterion and the number of copies of the uplink packet to transmit. In some examples, the selection component 815 may select the subset of the set of configured carriers based on a result of a CCA procedure performed on at least one carrier of the set of configured carriers. In some examples, the selection component 815 may select the subset of the set of configured carriers based on a signal strength metric generated for a carrier of the set of configured carriers. In some cases, the signal strength metric is a RSRP metric, a reference signal metric, a channel quality metric, a SINR metric, SNR metric, a rank metric, or any combination thereof. In some cases, the selection criterion is based on comparing the signal strength metric to a signal strength threshold.

In some examples, the selection component 815 may select the subset of the set of configured carriers based on the ordering and the number of copies of the uplink packet to transmit. In some examples, the selection component 815 may select the subset of the set of configured carriers based on an exposure metric determined for transmissions on the subset of the carriers. In some examples, the selection component 815 may determine to transmit on one or more of the set of configured carriers based on detecting exposure crossing an exposure threshold. In some examples, the selection component 815 may determine a number of carriers to include in the subset based on detecting exposure crossing an exposure threshold.

In some examples, the selection component 815 may select the subset of the set of configured carriers based on one or more of a number of HARQ retransmissions of a copy of the uplink packet or a number of HARQ retransmissions of a copy of a previous uplink packet. In some cases, the selection criterion is based on the result of the CCA procedure indicating carrier availability. In some cases, the selection criterion is based on a comparison of an exposure metric to a permissible exposure threshold. The packet component 820 may transmit an uplink packet transmission including the copy of the uplink packet on each carrier of the subset of the set of configured carriers based on the uplink packet duplication configuration. In some cases, the uplink packet transmission is an initial transmission of the uplink packet or a retransmission of the uplink packet. In some cases, the number of copies of the uplink packet is one of a minimum or maximum number of copies of the uplink packet to transmit.

The grant component 825 may receive control signaling that indicates a periodic grant for uplink transmission, where the uplink packet transmission including the copy of the uplink packet is transmitted on a carrier of the subset of the set of configured carriers based on the periodic grant. In some examples, the grant component 825 may receive DCI that indicates a grant for uplink transmission, where the uplink packet transmission including the copy of the uplink packet is transmitted on a carrier of the subset of the set of configured carriers based on the grant. The determination component 830 may determine not to transmit a copy of the uplink packet on a first carrier of the set of carriers based at least on part on determining that a number of transmissions of the copy of the uplink packet satisfies the number of copies of the uplink packet to transmit. In some examples, the determination component 830 may determine not to transmit a copy of the uplink packet on any carrier of the set of configured carriers having a signal strength measurement that does not satisfy a threshold.

The measurement component 835 may generate a signal strength measurement for one or more of the set of configured carriers. In some examples, the measurement component 835 may generate the signal strength measurement for a downlink beam. In some cases, the signal strength measurement for each carrier of the subset of the set of configured carriers satisfies a signal strength threshold indicated in the selection criterion. In some cases, the signal strength measurement for at least one carrier of the subset of the set of configured carriers satisfies a signal strength threshold indicated in the selection criterion. The order component 840 may order the set of configured carriers based on the one or more signal strength measurements.

Figure 9:
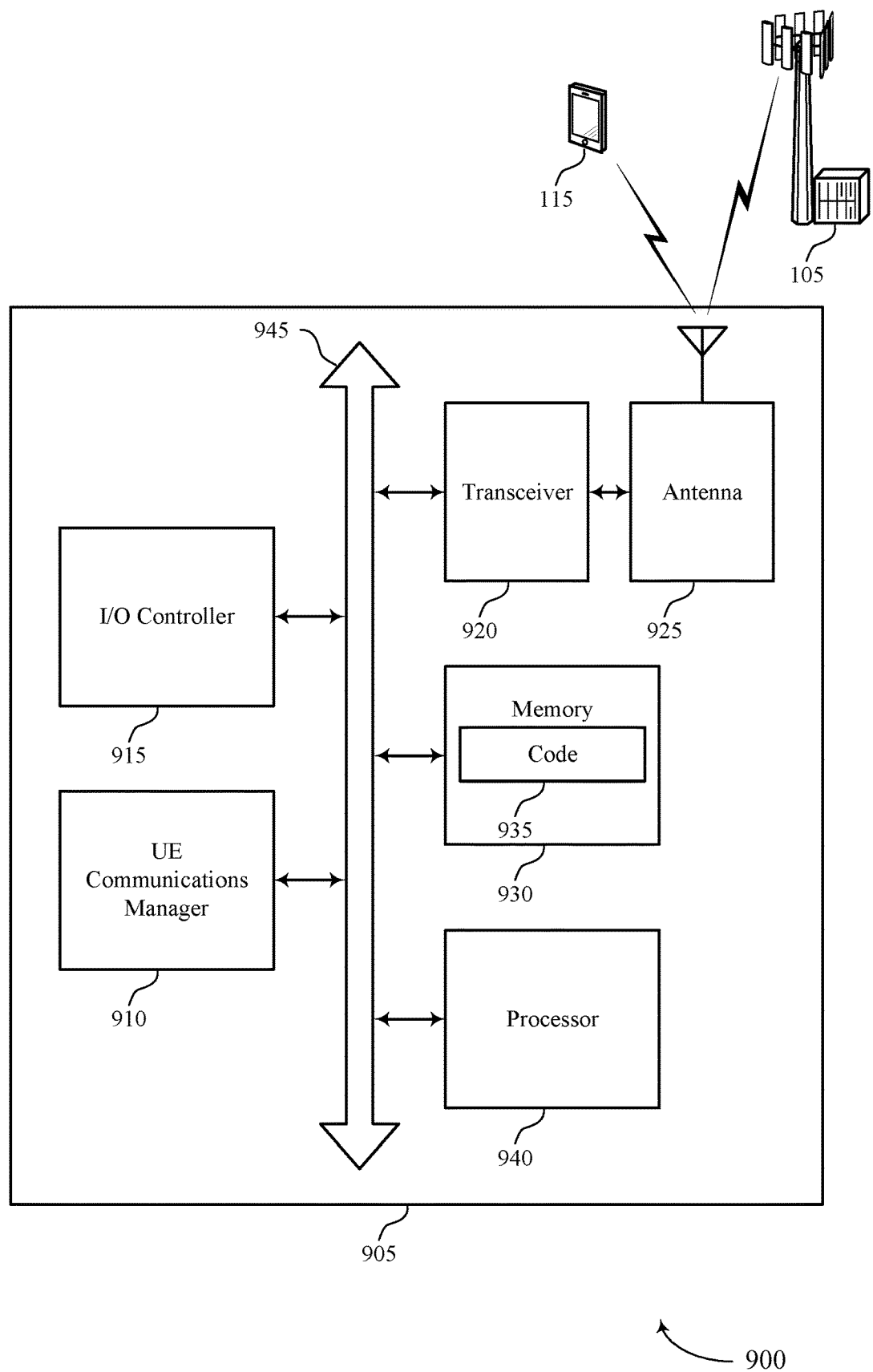
FIG. 9 shows a diagram of a system including a device that supports packet duplication carrier enhancements in accordance with aspects of the present disclosure.

FIG. 9 shows a diagram of a system 900 including a device 905 that supports packet duplication carrier enhancements in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive an uplink packet duplication configuration that indicates a set of configured carriers and a number of copies of an uplink packet to transmit, select a subset of the set of configured carriers based on a selection criterion and the number of copies of the uplink packet to transmit, and transmit an uplink packet transmission including the copy of the uplink packet on each carrier of the subset of the set of configured carriers based on the uplink packet duplication configuration. The UE communications manager 910 may enable device 905 to experience improved reliability for uplink packet transmissions, increased spectral efficiency, higher data rates and, in some examples, low latency for wireless communications, among other benefits based in part on an uplink packet duplication configuration. Additionally, the UE communications manager 910 may enable device 905 to experience reduced power consumption by decreasing a number of carriers for transmitting copies of an uplink packet based in part on an uplink packet duplication configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases the device 905 may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting packet duplication carrier enhancements).

Figure 10:
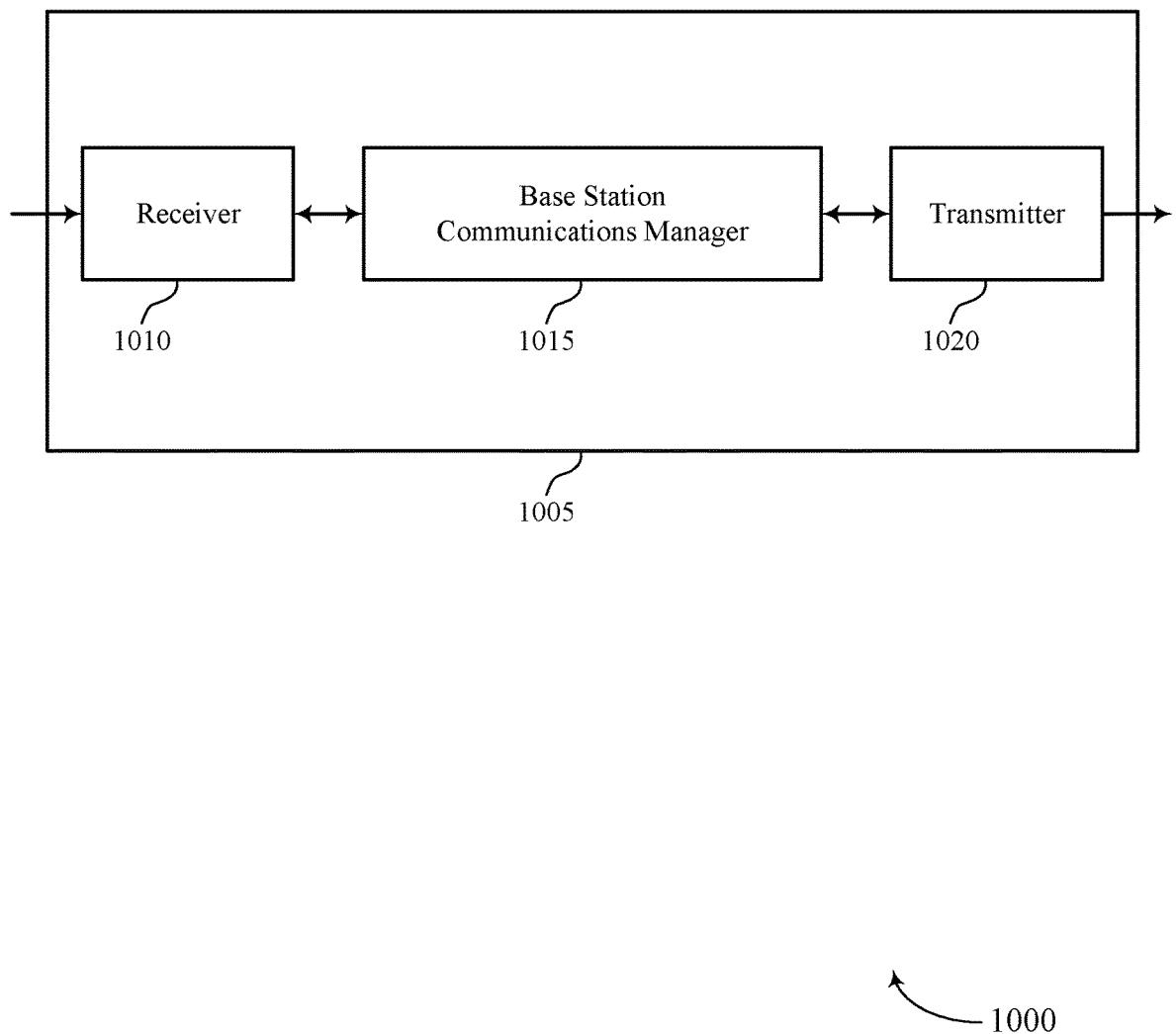
FIGS. 10 and 11 show block diagrams of devices that support packet duplication carrier enhancements in accordance with aspects of the present disclosure.

FIG. 10 shows a block diagram 1000 of a device 1005 that supports packet duplication carrier enhancements in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to packet duplication carrier enhancements, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit, to a UE, an uplink packet duplication configuration that indicates a set of configured carriers and a number of copies of an uplink packet to transmit and monitor for an uplink packet transmission including a copy of the uplink packet via at least one carrier of a subset of the set of configured carriers based on the uplink packet duplication configuration. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
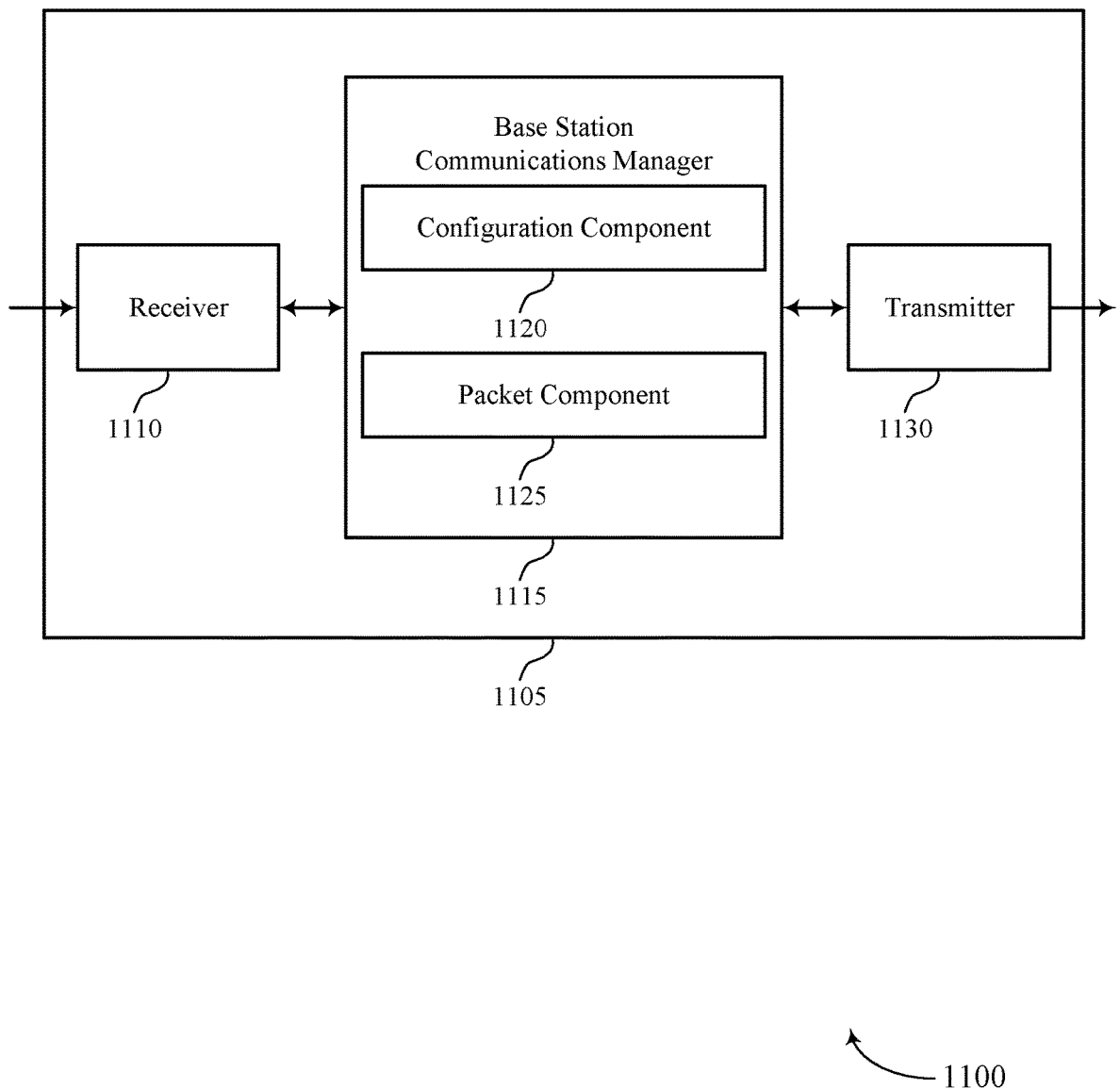

FIG. 11 shows a block diagram 1100 of a device 1105 that supports packet duplication carrier enhancements in accordance with aspects of the present disclosure. The device 1105 may be an example of aspects of a device 1005, or a base station 105 as described herein. The device 1105 may include a receiver 1110, a base station communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to packet duplication carrier enhancements, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a configuration component 1120 and a packet component 1125. The base station communications manager 1115 may be an example of aspects of the base station communications manager 1310 described herein.

The configuration component 1120 may transmit, to a UE, an uplink packet duplication configuration that indicates a set of configured carriers and a number of copies of an uplink packet to transmit. The packet component 1125 may monitor for an uplink packet transmission including a copy of the uplink packet via at least one carrier of a subset of the set of configured carriers based on the uplink packet duplication configuration.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
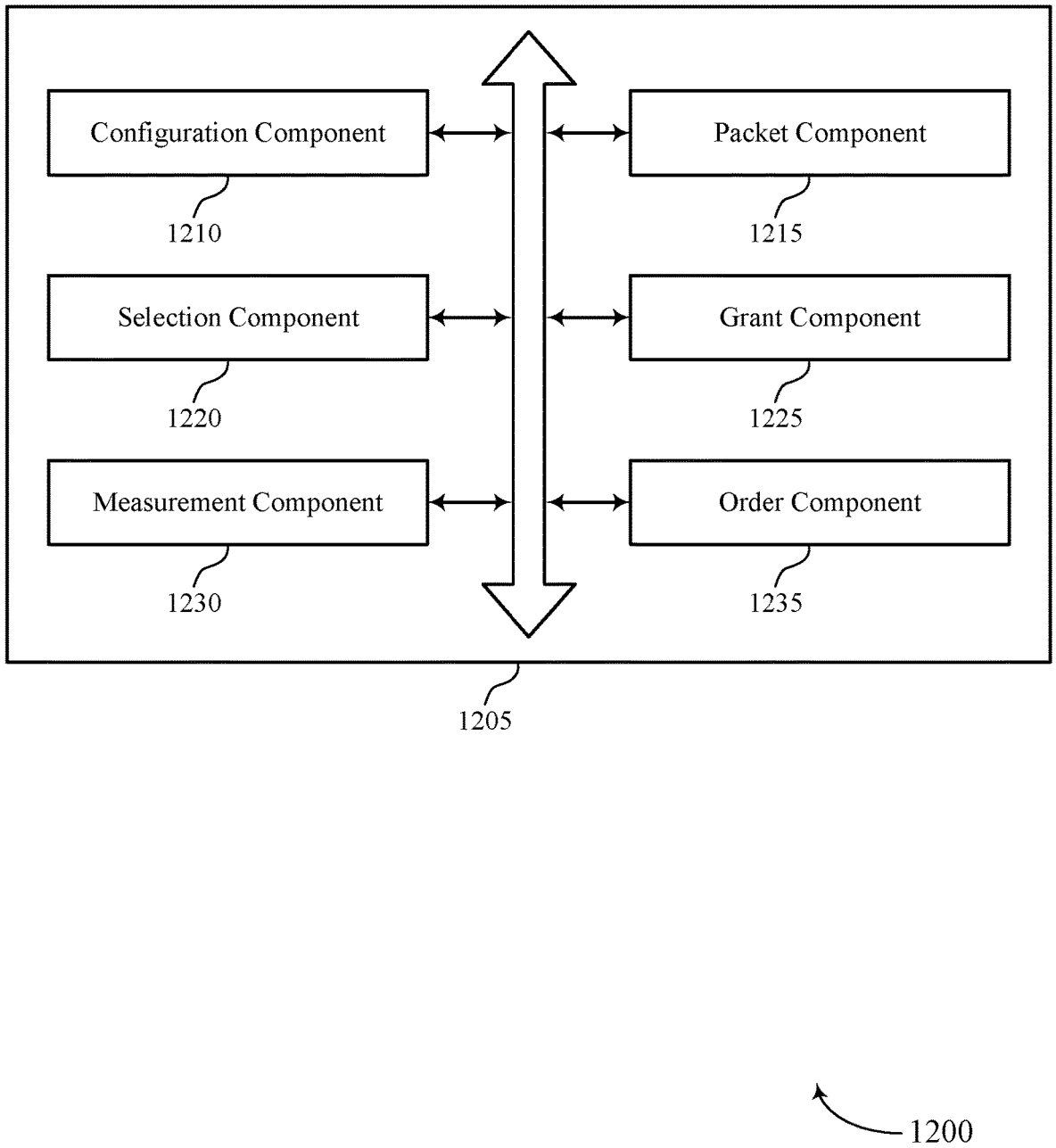
FIG. 12 shows a block diagram of a communications manager that supports packet duplication carrier enhancements in accordance with aspects of the present disclosure.

FIG. 12 shows a block diagram 1200 of a base station communications manager 1205 that supports packet duplication carrier enhancements in accordance with aspects of the present disclosure. The base station communications manager 1205 may be an example of aspects of a base station communications manager 1015, a base station communications manager 1115, or a base station communications manager 1310 described herein. The base station communications manager 1205 may include a configuration component 1210, a packet component 1215, a selection component 1220, a grant component 1225, a measurement component 1230, and an order component 1235. Each of these modules may communicate, directly or indirectly, with one another (e.g., via one or more buses).

The configuration component 1210 may transmit, to a UE, an uplink packet duplication configuration that indicates a set of configured carriers and a number of copies of an uplink packet to transmit. In some cases, the uplink packet duplication configuration indicates a selection criterion for selecting the subset. In some cases, the uplink packet duplication configuration is an uplink PDCP duplication configuration.

The packet component 1215 may monitor for an uplink packet transmission including a copy of the uplink packet via at least one carrier of a subset of the set of configured carriers based on the uplink packet duplication configuration. In some examples, the packet component 1215 may receive the uplink packet transmission including the copy of the uplink packet via a carrier of the subset of the set of configured carriers. In some examples, the packet component 1215 may determine not to monitor for a copy of the uplink packet on a first carrier of the set of carriers based at least on part on determining that a number of transmissions of the copy of the uplink packet satisfies the number of copies of the uplink packet to transmit. In some examples, the packet component 1215 may determine not to monitor for a copy of the uplink packet on any carrier of the set of configured carriers having a signal strength measurement that does not satisfy a threshold.

In some examples, the packet component 1215 may monitor a shared radio frequency band for the uplink packet transmission including the copy of the uplink packet on a carrier of the subset of the set of configured carriers. In some examples, the packet component 1215 may monitor a FR2 frequency band for the uplink packet transmission including the copy of the uplink packet on a carrier of the subset of the set of configured carriers. In some cases, the uplink packet transmission is an initial transmission of the uplink packet or a retransmission of the uplink packet. In some cases, the number of copies of the uplink packet is a minimum or maximum number of copies of the uplink packet to transmit.

The selection component 1220 may select the subset of the set of configured carriers based on a selection criterion and the number of copies of the uplink packet to transmit. In some examples, the selection component 1220 may transmit signaling to the UE that indicates a selection criterion for selecting the subset. In some examples, the selection component 1220 may select the subset of the set of configured carriers based on a result of an estimated CCA procedure for the UE performed on a carrier of the set of configured carriers. In some examples, the selection component 1220 may select the subset of the set of configured carriers based on a signal strength metric generated for each carrier of the set of configured carriers. In some examples, the selection component 1220 may select the subset of the set of configured carriers based on the ordering and the number of copies of the uplink packet to transmit. In some cases, a selection criterion for selecting the subset is the result of the estimated CCA procedure indicating carrier availability. In some cases, the signal strength metric is a measurement of an uplink reference signal, a measurement of a sounding reference signal, a measurement of a demodulation reference signal, a RSRP metric, a reference signal metric, a sounding reference signal metric, a channel quality metric, a SINR metric, SNR metric, a rank metric, or any combination thereof. In some cases, a selection criterion for selecting the subset is a signal strength threshold.

The grant component 1225 may transmit control signaling that indicates a periodic grant for uplink transmission for transmitting the uplink packet transmission including the copy of the uplink packet on a carrier of the subset of the set of configured carriers. In some examples, the grant component 1225 may transmit DCI that indicates a grant for uplink transmission for transmitting the uplink packet transmission including the copy of the uplink packet on a carrier of the subset of the set of configured carriers.

The measurement component 1230 may generate a signal strength measurement for one more of the set of configured carriers. In some examples, the measurement component 1230 may generate the signal strength measurement based on a measurement of a sounding reference signal transmitted by the UE. In some cases, the signal strength measurement for each carrier of the subset of the set of configured carriers satisfies a signal strength threshold indicated in a selection criterion for selecting the subset. In some cases, the signal strength measurement for at least one carrier of the subset of the set of configured carriers satisfies a signal strength threshold indicated in a selection criterion for selecting the subset. The order component 1235 may order the set of configured carriers based on the one or more signal strength measurements.

Figure 13:
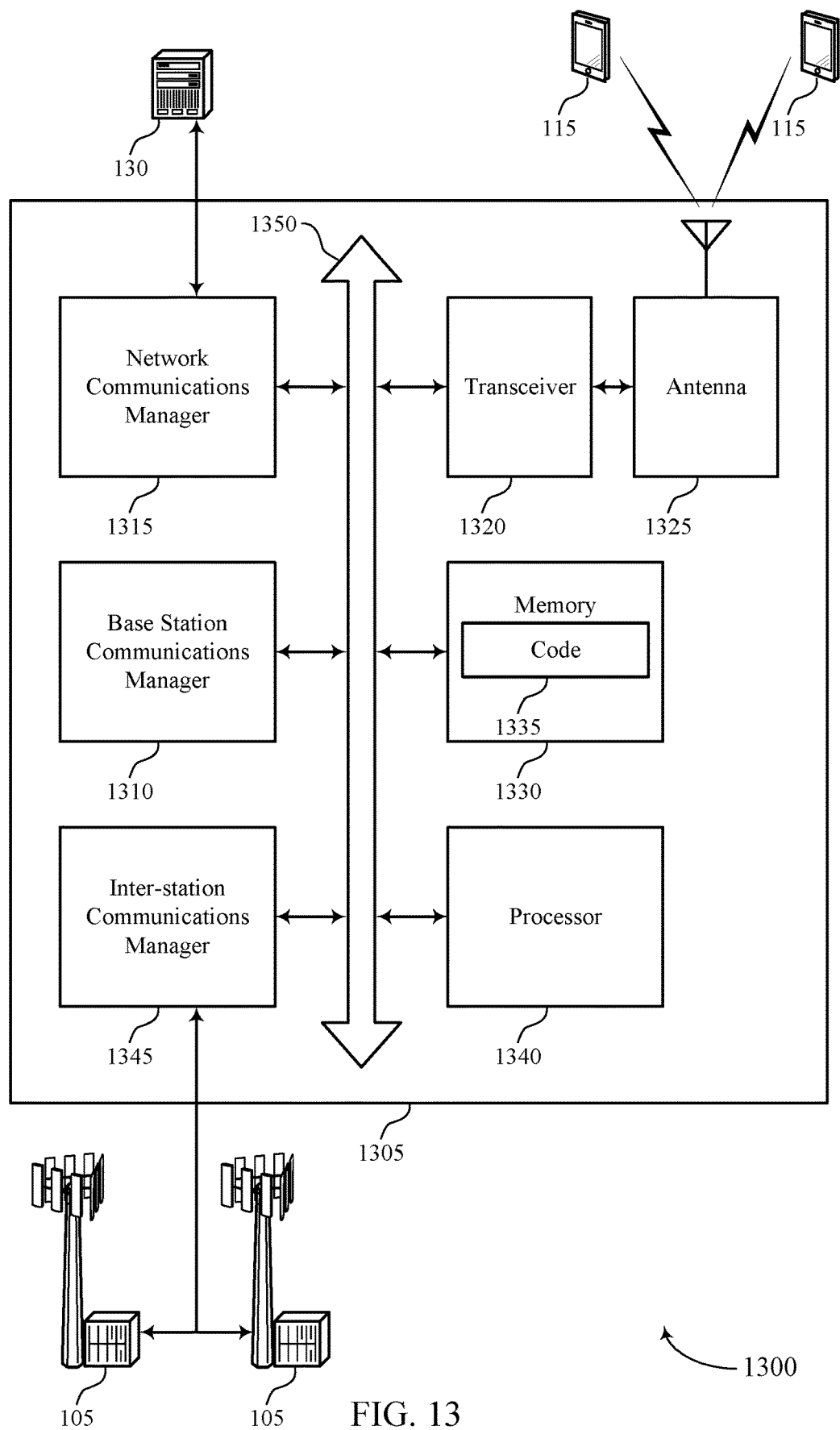
FIG. 13 shows a diagram of a system including a device that supports packet duplication carrier enhancements in accordance with aspects of the present disclosure.

FIG. 13 shows a diagram of a system 1300 including a device 1305 that supports packet duplication carrier enhancements in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit, to a UE, an uplink packet duplication configuration that indicates a set of configured carriers and a number of copies of an uplink packet to transmit and monitor for an uplink packet transmission including a copy of the uplink packet via at least one carrier of a subset of the set of configured carriers based on the uplink packet duplication configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting packet duplication carrier enhancements).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
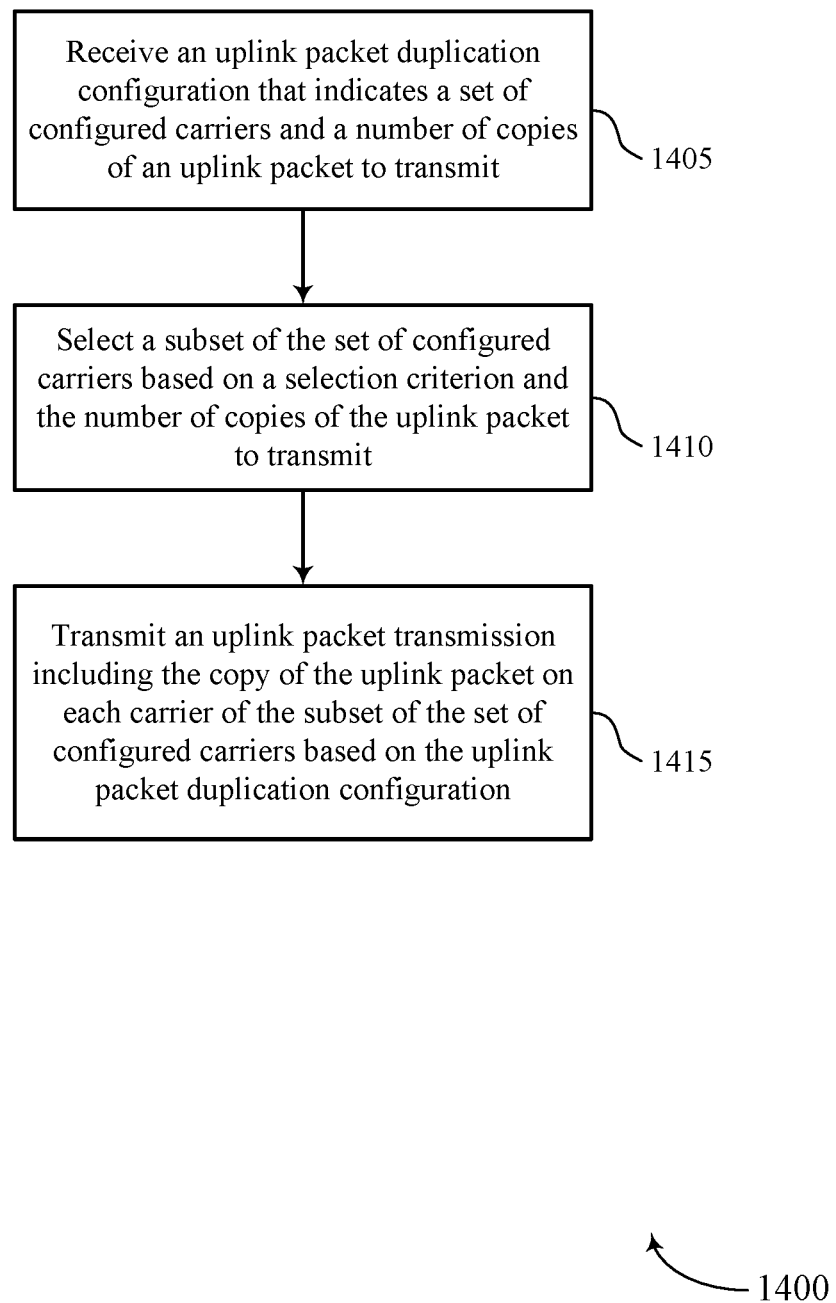
FIGS. 14 through 18 show flowcharts illustrating methods that support packet duplication carrier enhancements in accordance with aspects of the present disclosure.

FIG. 14 shows a flowchart illustrating a method 1400 that supports packet duplication carrier enhancements in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive an uplink packet duplication configuration that indicates a set of configured carriers and a number of copies of an uplink packet to transmit. The operations of 1405 may be performed according to the methods described herein. In some examples, aspects of the operations of 1405 may be performed by a configuration component as described with reference to FIGS. 6 through 9.

At 1410, the UE may select a subset of the set of configured carriers based on a selection criterion and the number of copies of the uplink packet to transmit. The operations of 1410 may be performed according to the methods described herein. In some examples, aspects of the operations of 1410 may be performed by a selection component as described with reference to FIGS. 6 through 9.

At 1415, the UE may transmit an uplink packet transmission including the copy of the uplink packet on each carrier of the subset of the set of configured carriers based on the uplink packet duplication configuration. The operations of 1415 may be performed according to the methods described herein. In some examples, aspects of the operations of 1415 may be performed by a packet component as described with reference to FIGS. 6 through 9.

Figure 15:
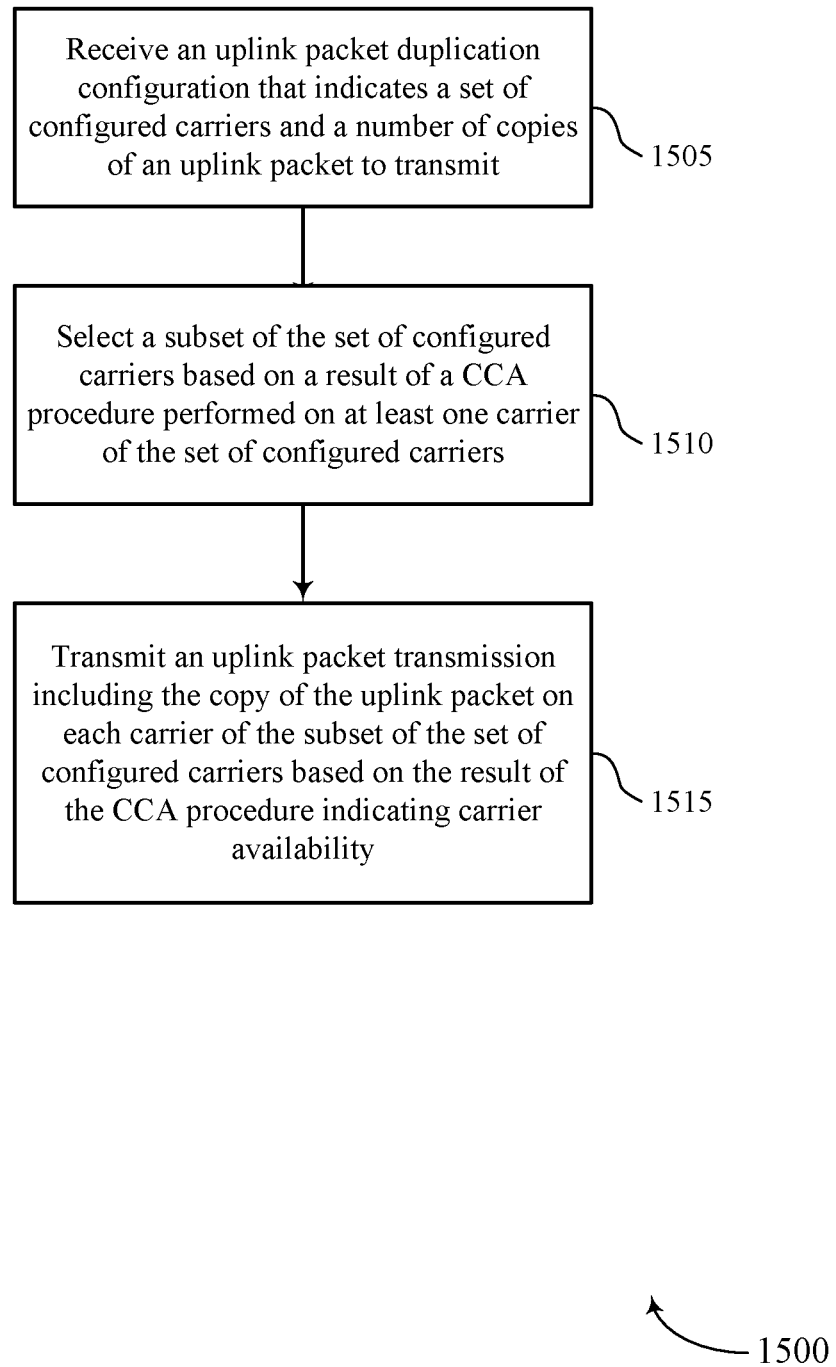

FIG. 15 shows a flowchart illustrating a method 1500 that supports packet duplication carrier enhancements in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive an uplink packet duplication configuration that indicates a set of configured carriers and a number of copies of an uplink packet to transmit. The operations of 1505 may be performed according to the methods described herein. In some examples, aspects of the operations of 1505 may be performed by a configuration component as described with reference to FIGS. 6 through 9.

At 1510, the UE may select a subset of the set of configured carriers based on a result of a CCA procedure performed on at least one carrier of the set of configured carriers. The operations of 1510 may be performed according to the methods described herein. In some examples, aspects of the operations of 1510 may be performed by a selection component as described with reference to FIGS. 6 through 9.

At 1515, the UE may transmit an uplink packet transmission including the copy of the uplink packet on each carrier of the subset of the set of configured carriers based on the result of the CCA procedure indicating carrier availability. The operations of 1515 may be performed according to the methods described herein. In some examples, aspects of the operations of 1515 may be performed by a packet component as described with reference to FIGS. 6 through 9.

Figure 16:
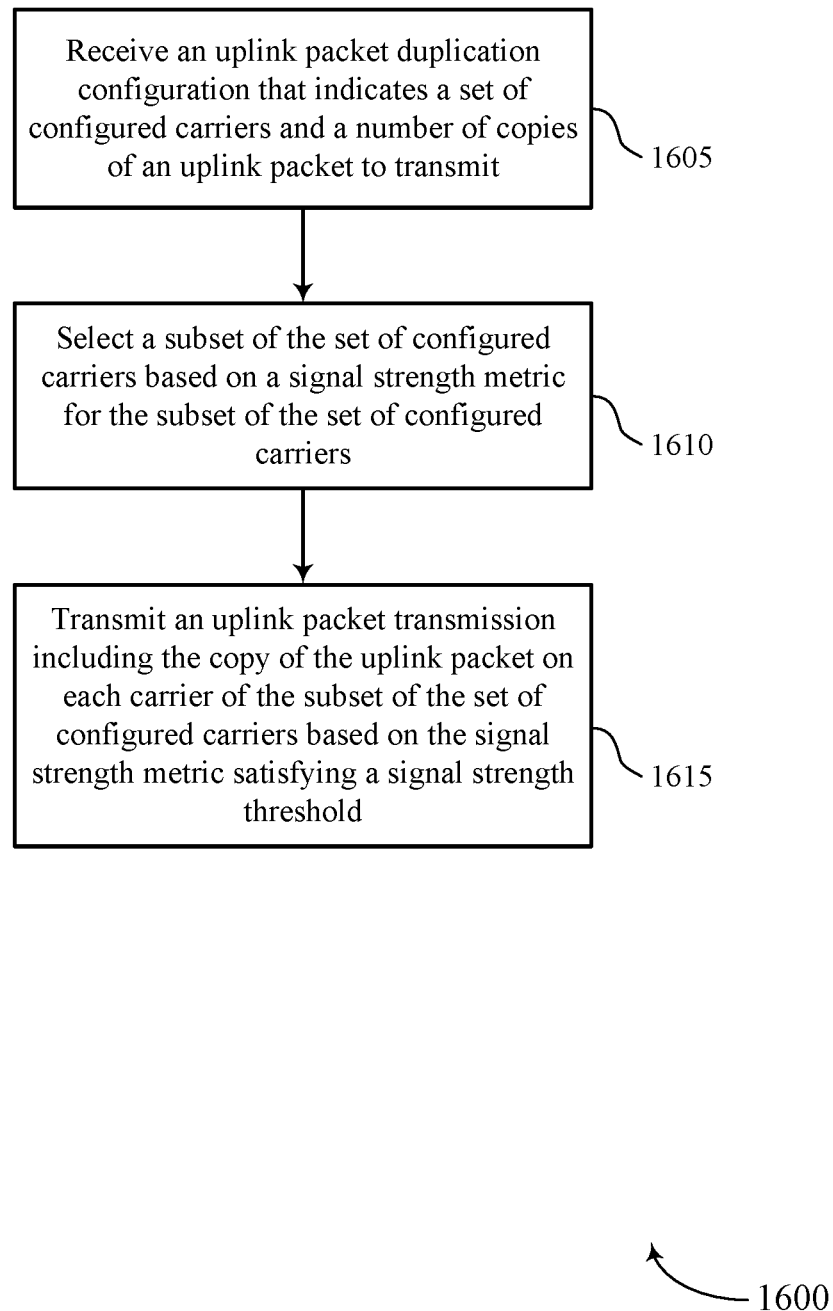

FIG. 16 shows a flowchart illustrating a method 1600 that supports packet duplication carrier enhancements in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive an uplink packet duplication configuration that indicates a set of configured carriers and a number of copies of an uplink packet to transmit. The operations of 1605 may be performed according to the methods described herein. In some examples, aspects of the operations of 1605 may be performed by a configuration component as described with reference to FIGS. 6 through 9.

At 1610, the UE may select a subset of the set of configured carriers based on a signal strength metric for the subset of the set of configured carriers. The operations of 1610 may be performed according to the methods described herein. In some examples, aspects of the operations of 1610 may be performed by a selection component as described with reference to FIGS. 6 through 9.

At 1615, the UE may transmit a subset of the set of configured carriers based on a signal strength metric for the subset of the set of configured carriers. The operations of 1615 may be performed according to the methods described herein. In some examples, aspects of the operations of 1615 may be performed by a packet component as described with reference to FIGS. 6 through 9.

Figure 17:
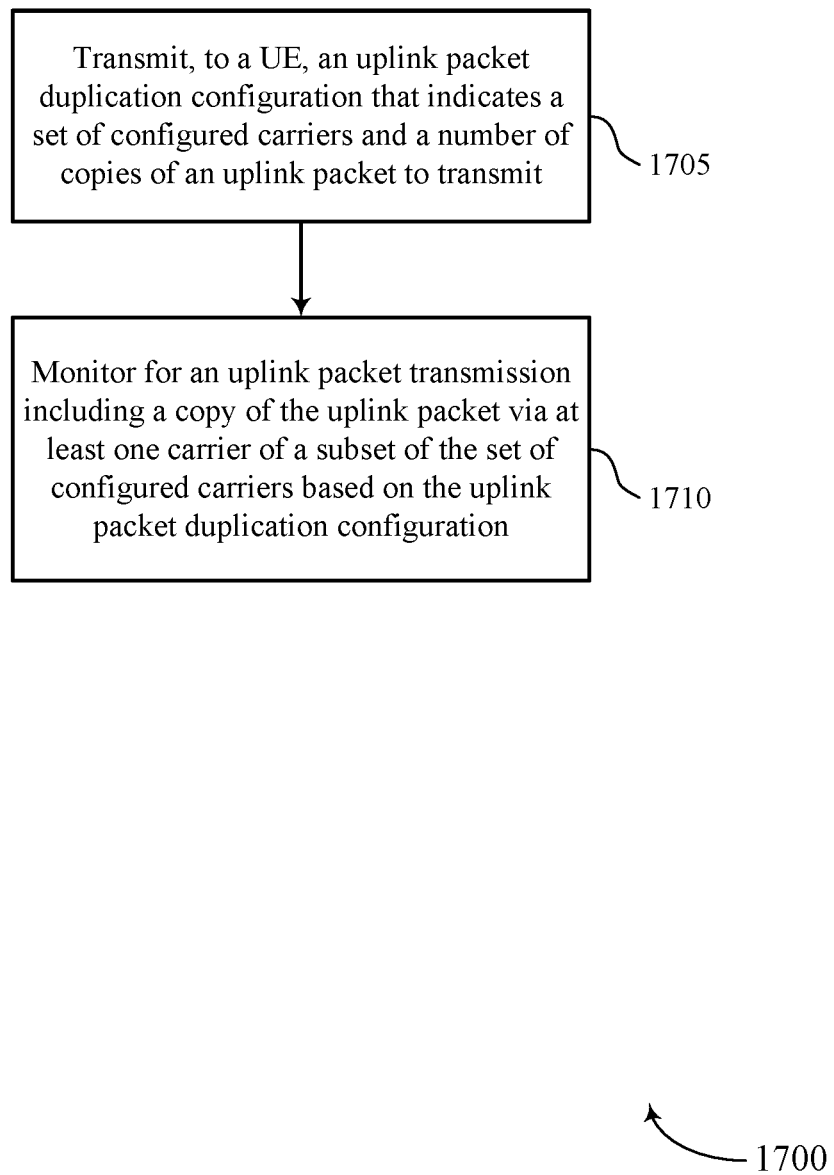

FIG. 17 shows a flowchart illustrating a method 1700 that supports packet duplication carrier enhancements in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, an uplink packet duplication configuration that indicates a set of configured carriers and a number of copies of an uplink packet to transmit. The operations of 1705 may be performed according to the methods described herein. In some examples, aspects of the operations of 1705 may be performed by a configuration component as described with reference to FIGS. 10 through 13.

At 1710, the base station may monitor for an uplink packet transmission including a copy of the uplink packet via at least one carrier of a subset of the set of configured carriers based on the uplink packet duplication configuration. The operations of 1710 may be performed according to the methods described herein. In some examples, aspects of the operations of 1710 may be performed by a packet component as described with reference to FIGS. 10 through 13.

Figure 18:
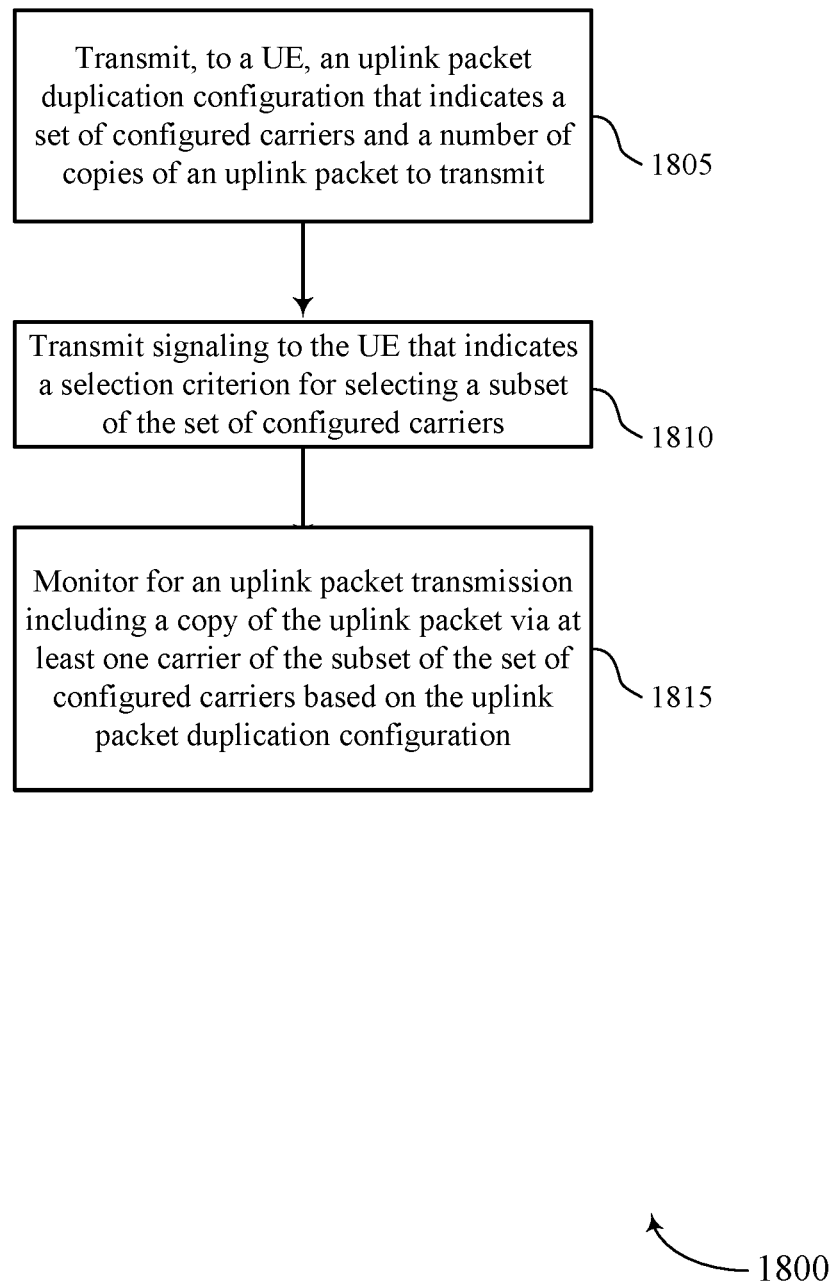

FIG. 18 shows a flowchart illustrating a method 1800 that supports packet duplication carrier enhancements in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, an uplink packet duplication configuration that indicates a set of configured carriers and a number of copies of an uplink packet to transmit. The operations of 1805 may be performed according to the methods described herein. In some examples, aspects of the operations of 1805 may be performed by a configuration component as described with reference to FIGS. 10 through 13.

At 1810, the base station may transmit signaling to the UE that indicates a selection criterion for selecting a subset of the set of configured carriers. The operations of 1810 may be performed according to the methods described herein. In some examples, aspects of the operations of 1810 may be performed by a selection component as described with reference to FIGS. 10 through 13.

At 1815, the base station may monitor for an uplink packet transmission including a copy of the uplink packet via at least one carrier of the subset of the set of configured carriers based on the uplink packet duplication configuration. The operations of 1815 may be performed according to the methods described herein. In some examples, aspects of the operations of 1815 may be performed by a packet component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Embodiment 1: A method of wireless communications at a UE comprising: receiving an uplink packet duplication configuration that indicates a set of configured carriers and a number of copies of an uplink packet to transmit, selecting a subset of the set of configured carriers based on a selection criterion and the number of copies of the uplink packet to transmit, and transmitting an uplink packet transmission including the copy of the uplink packet on each carrier of the subset of the set of configured carriers based on the uplink packet duplication configuration.

Embodiment 2: The method of embodiment 1, further comprising: receiving control signaling that indicates a periodic grant for uplink transmission, where the uplink packet transmission including the copy of the uplink packet may be transmitted on a carrier of the subset of the set of configured carriers based on the periodic grant.

Embodiment 3: The method of any of embodiments 1 or 2, further comprising: receiving downlink control information that indicates a grant for uplink transmission, wherein the uplink packet transmission comprising the copy of the uplink packet is transmitted on a carrier of the subset of the plurality of configured carriers based at least in part on the grant.

Embodiment 4: The method of any of embodiments 1 to 3, further comprising: receiving signaling that indicates the selection criterion.

Embodiment 5: The method of any of embodiments 1 to 4, further comprising: selecting the subset of the plurality of configured carriers based at least in part on a result of a CCA procedure performed on at least one carrier of the plurality of configured carriers.

Embodiment 6: The method of embodiment 5, wherein the selection criterion is based at least in part on the result of the CCA procedure indicating carrier availability.

Embodiment 7: The method of any of embodiments 1 to 6, further comprising: determining not to transmit a copy of the uplink packet on a first carrier of the plurality of carriers based at least on part on determining that a number of transmissions of the copy of the uplink packet satisfies the number of copies of the uplink packet to transmit.

Embodiment 8: The method of any of embodiments 1 to 7, further comprising: determining not to transmit a copy of the uplink packet on any carrier of the plurality of configured carriers having a signal strength measurement that does not satisfy a threshold.

Embodiment 9: The method of any of embodiments 1 to 8, further comprising: selecting the subset of the plurality of configured carriers based at least in part on a signal strength metric generated for a carrier of the plurality of configured carriers.

Embodiment 10: The method of embodiment 9, wherein the signal strength metric is a reference signal received power metric, a reference signal metric, a channel quality metric, a signal to interference plus noise ratio metric, signal to noise ratio metric, a rank metric, or any combination thereof.

Embodiment 11: The method of any of embodiments 9 to 10, wherein the selection criterion is based at least in part on comparing the signal strength metric to a signal strength threshold.

Embodiment 12: The method of any of embodiments 1 to 11, further comprising: generating a signal strength measurement for one or more of the plurality of configured carriers; ordering the plurality of configured carriers based at least in part on the one or more signal strength measurements; and selecting the subset of the plurality of configured carriers based at least in part on the ordering and the number of copies of the uplink packet to transmit.

Embodiment 13: The method of embodiment 12, wherein the signal strength measurement for each carrier of the subset of the plurality of configured carriers satisfies a signal strength threshold indicated in the selection criterion.

Embodiment 14: The method of any of embodiments 12 to 13, wherein the signal strength measurement for at least one carrier of the subset of the plurality of configured carriers satisfies a signal strength threshold indicated in the selection criterion.

Embodiment 15: The method of any of embodiments 12 to 14, further comprising: generating the signal strength measurement for a downlink beam.

Embodiment 16: The method of any of embodiments 1 to 15, further comprising: selecting the subset of the plurality of configured carriers based at least in part on an exposure metric determined for transmissions on the subset of the carriers.

Embodiment 17: The method of embodiment 16, wherein the selection criterion is based at least in part on a comparison of an exposure metric to a permissible exposure threshold.

Embodiment 18: The method of any of embodiments 1 to 17, further comprising: determining to transmit on one or more of the plurality of configured carriers based at least in part on detecting exposure crossing an exposure threshold.

Embodiment 19: The method of any of embodiments 1 to 18, further comprising: determining a number of carriers to include in the subset based at least in part on detecting exposure crossing an exposure threshold.

Embodiment 20: The method of any of embodiments 1 to 19, wherein the uplink packet duplication configuration indicates the selection criterion.

Embodiment 21: The method of any of embodiments 1 to 20, wherein the uplink packet transmission is an initial transmission of the uplink packet or a retransmission of the uplink packet.

Embodiment 22: The method of any of embodiments 1 to 21, wherein the uplink packet duplication configuration is an uplink packet data convergence protocol duplication configuration.

Embodiment 23: The method of any of embodiments 1 to 22, wherein the number of copies of the uplink packet is one of a minimum or maximum number of copies of the uplink packet to transmit.

Embodiment 24: The method of any of embodiments 1 to 23, further comprising: selecting the subset of the plurality of configured carriers based at least in part on one or more of a number of Hybrid automatic repeat request (HARQ) retransmissions of a copy of the uplink packet or a number of HARQ retransmissions of a copy of a previous uplink packet.

Embodiment 25: An apparatus comprising at least one means for performing a method of any of embodiments 1 to 24.

Embodiment 26: An apparatus for wireless communications comprising a processor; memory in electronic communication with the processor; and instructions stored in the memory and executable by the processor to cause the apparatus to perform a method of any of embodiments 1 to 24.

Embodiment 27: A non-transitory computer-readable medium storing code for wireless communications, the code comprising instructions executable by a processor to perform a method of any of embodiments 1 to 24.

Embodiment 28: A method of wireless communications by a base station comprising: transmitting, to a UE, an uplink packet duplication configuration that indicates a set of configured carriers and a number of copies of an uplink packet to transmit and monitoring for an uplink packet transmission including a copy of the uplink packet via at least one carrier of a subset of the set of configured carriers based on the uplink packet duplication configuration.

Embodiment 29: The method of embodiment 28, further comprising: selecting the subset of the plurality of configured carriers based at least in part on a selection criterion and the number of copies of the uplink packet to transmit.

Embodiment 30: The method of any of embodiments 28 or 29, further comprising: receiving the uplink packet transmission comprising the copy of the uplink packet via a carrier of the subset of the plurality of configured carriers.

Embodiment 31: The method of any of embodiments 28 to 30, further comprising: transmitting control signaling that indicates a periodic grant for uplink transmission for transmitting the uplink packet transmission comprising the copy of the uplink packet on a carrier of the subset of the plurality of configured carriers.

Embodiment 32: The method of any of embodiments 28 to 31, further comprising: transmitting downlink control information that indicates a grant for uplink transmission for transmitting the uplink packet transmission comprising the copy of the uplink packet on a carrier of the subset of the plurality of configured carriers.

Embodiment 33: The method of any of embodiments 28 to 32, further comprising: transmitting signaling to the UE that indicates a selection criterion for selecting the subset.

Embodiment 34: The method of any of embodiments 28 to 33, further comprising: selecting the subset of the plurality of configured carriers based at least in part on a result of an estimated CCA procedure for the UE performed on a carrier of the plurality of configured carriers.

Embodiment 35: The method of embodiments 34, wherein a selection criterion for selecting the subset is the result of the estimated CCA procedure indicating carrier availability.

Embodiment 36: The method of any of embodiments 28 to 35, further comprising: determining not to monitor for a copy of the uplink packet on a first carrier of the plurality of carriers based at least on part on determining that a number of transmissions of the copy of the uplink packet satisfies the number of copies of the uplink packet to transmit.

Embodiment 37: The method of any of embodiments 28 to 36, further comprising: determining not to monitor for a copy of the uplink packet on any carrier of the plurality of configured carriers having a signal strength measurement that does not satisfy a threshold.

Embodiment 38: The method of any of embodiments 28 to 37, further comprising: selecting the subset of the plurality of configured carriers based at least in part on a signal strength metric generated for each carrier of the plurality of configured carriers.

Embodiment 39: The method of embodiment 38, wherein the signal strength metric is a measurement of an uplink reference signal, a measurement of a sounding reference signal, a measurement of a demodulation reference signal, a reference signal received power metric, a reference signal metric, a sounding reference signal metric, a channel quality metric, a signal to interference plus noise ratio metric, signal to noise ratio metric, a rank metric, or any combination thereof.

Embodiment 40: The method of any of embodiments 38 to 39, wherein a selection criterion for selecting the subset is a signal strength threshold.

Embodiment 41: The method of any of embodiments 28 to 40, further comprising: generating a signal strength measurement for one more of the plurality of configured carriers; ordering the plurality of configured carriers based at least in part on the one or more signal strength measurements; and selecting the subset of the plurality of configured carriers based at least in part on the ordering and the number of copies of the uplink packet to transmit.

Embodiment 42: The method of any of embodiments 28 to 41, wherein the signal strength measurement for each carrier of the subset of the plurality of configured carriers satisfies a signal strength threshold indicated in a selection criterion for selecting the subset.

Embodiment 43: The method of embodiment 42, wherein the signal strength measurement for at least one carrier of the subset of the plurality of configured carriers satisfies a signal strength threshold indicated in a selection criterion for selecting the subset.

Embodiment 44: The method of any of embodiments 42 to 43, further comprising: generating the signal strength measurement based at least in part on a measurement of a sounding reference signal transmitted by the UE.

Embodiment 45: The method of any of embodiments 42 to 44, wherein the uplink packet duplication configuration indicates a selection criterion for selecting the subset.

Embodiment 46: The method of any of embodiments 28 to 45, wherein the uplink packet transmission is an initial transmission of the uplink packet or a retransmission of the uplink packet.

Embodiment 47: The method of any of embodiments 28 to 46, wherein the uplink packet duplication configuration is an uplink packet data convergence protocol duplication configuration.

Embodiment 48: The method of any of embodiments 28 to 47, wherein the number of copies of the uplink packet is a minimum or maximum number of copies of the uplink packet to transmit.

Embodiment 49: The method of any of embodiments 28 to 48, further comprising: monitoring a shared radio frequency band for the uplink packet transmission comprising the copy of the uplink packet on a carrier of the subset of the plurality of configured carriers.

Embodiment 50: The method of any of embodiments 28 to 49, further comprising: monitoring a FR2 frequency band for the uplink packet transmission comprising the copy of the uplink packet on a carrier of the subset of the plurality of configured carriers.

Embodiment 51: An apparatus comprising at least one means for performing a method of any of embodiments 28 to 50.

Embodiment 52: An apparatus for wireless communications comprising a processor; memory in electronic communication with the processor; and instructions stored in the memory and executable by the processor to cause the apparatus to perform a method of any of embodiments 28 to 50.

Embodiment 53: A non-transitory computer-readable medium storing code for wireless communications, the code comprising instructions executable by a processor to perform a method of any of embodiments 28 to 50.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    receiving an uplink packet duplication configuration that indicates a plurality of configured component carriers and a number of copies of an uplink packet to transmit on one or more of the plurality of configured component carriers;
    receiving downlink control information signaling that indicates a selection criterion:
    selecting a subset of the plurality of configured component carriers based at least in part on the selection criterion and the number of copies of the uplink packet to transmit; and
    transmitting an uplink packet transmission comprising a copy of the uplink packet on each component carrier of the subset of the plurality of configured component carriers based at least in part on the uplink packet duplication configuration.

2. The method of claim 1, further comprising:
    receiving control signaling that indicates a periodic grant for uplink transmission, wherein the uplink packet transmission comprising the copy of the uplink packet is transmitted on a component carrier of the subset of the plurality of configured component carriers based at least in part on the periodic grant.

3. The method of claim 1, further comprising:
    receiving downlink control information that indicates a grant for uplink transmission, wherein the uplink packet transmission comprising the copy of the uplink packet is transmitted on a component carrier of the subset of the plurality of configured component carriers based at least in part on the grant.

4. The method of claim 1, wherein selecting the subset of the plurality of configured component carriers comprises:
    selecting the subset of the plurality of configured component carriers based at least in part on a result of a clear channel assessment procedure performed on at least one component carrier of the plurality of configured component carriers, wherein the selection criterion is based at least in part on the result of the clear channel assessment procedure indicating component carrier availability.

5. The method of claim 1, wherein selecting the subset of the plurality of configured component carriers comprises:
determining not to transmit the copy of the uplink packet on a first component carrier of the plurality of configured component carriers based at least on part on determining that a number of transmissions of the copy of the uplink packet satisfies the number of copies of the uplink packet to transmit.

6. The method of claim 1, wherein selecting the subset of the plurality of configured component carriers comprises:
determining not to transmit the copy of the uplink packet on any component carrier of the plurality of configured component carriers having a signal strength measurement that does not satisfy a threshold.

7. The method of claim 1, wherein selecting the subset of the plurality of configured component carriers comprises:
selecting the subset of the plurality of configured component carriers based at least in part on a signal strength metric generated for a component carrier of the plurality of configured component carriers, wherein the signal strength metric is a reference signal received power metric, a reference signal metric, a channel quality metric, a signal to interference plus noise ratio metric, signal to noise ratio metric, a rank metric, or any combination thereof.

8. The method of claim 7, wherein the selection criterion is based at least in part on comparing the signal strength metric to a signal strength threshold.

9. The method of claim 1, wherein selecting the subset of the plurality of configured component carriers comprises:
generating one or more signal strength measurements for one or more of the plurality of configured component carriers;
ordering the plurality of configured component carriers based at least in part on the one or more signal strength measurements; and
selecting the subset of the plurality of configured component carriers based at least in part on the ordering and the number of copies of the uplink packet to transmit.

10. The method of claim 9, wherein a signal strength measurement for each component carrier of the subset of the plurality of configured component carriers satisfies a signal strength threshold indicated in the selection criterion.

11. The method of claim 9, wherein a signal strength measurement for at least one component carrier of the subset of the plurality of configured component carriers satisfies a signal strength threshold indicated in the selection criterion.

12. The method of claim 9, wherein generating the one or more signal strength measurements comprises:
generating a signal strength measurement for a downlink beam.

13. The method of claim 1, wherein selecting the subset of the plurality of configured component carriers comprises:
selecting the subset of the plurality of configured component carriers based at least in part on an exposure metric determined for transmissions on the subset of the plurality of configured component carriers, wherein the selection criterion is based at least in part on a comparison of the exposure metric to a permissible exposure threshold; and
determining to transmit on one or more of the plurality of configured component carriers based at least in part on detecting the exposure metric crossing the permissible exposure threshold.

14. The method of claim 1, wherein selecting the subset of the plurality of configured component carriers comprises:
determining a number of component carriers to include in the subset based at least in part on detecting exposure crossing an exposure threshold.

15. The method of claim 1, wherein the uplink packet duplication configuration indicates the selection criterion, and wherein the uplink packet duplication configuration is an uplink packet data convergence protocol duplication configuration.

16. The method of claim 1, wherein the uplink packet transmission is an initial transmission of the uplink packet or a retransmission of the uplink packet.

17. The method of claim 1, wherein the number of copies of the uplink packet is one of a minimum or maximum number of copies of the uplink packet to transmit.

18. The method of claim 1, wherein selecting the subset of the plurality of configured component carriers comprises:
selecting the subset of the plurality of configured component carriers based at least in part on one or more of a number of Hybrid automatic repeat request (HARQ) retransmissions of the copy of the uplink packet or a number of HARQ retransmissions of a copy of a previous uplink packet.

19. A method for wireless communications by a network device, comprising:
transmitting an uplink packet duplication configuration that indicates a plurality of configured component carriers and a number of copies of an uplink packet to transmit on one or more of the plurality of configured component carriers;
selecting a subset of the plurality of configured component carriers based at least in part on a selection criterion and the number of copies of the uplink packet to transmit;
transmitting downlink control information signaling that indicates the selection criterion; and
monitoring for an uplink packet transmission comprising a copy of the uplink packet via at least one component carrier of the subset of the plurality of configured component carriers based at least in part on the uplink packet duplication configuration.

20. The method of claim 19, further comprising:
receiving the uplink packet transmission comprising the copy of the uplink packet via a component carrier of the subset of the plurality of configured component carriers.

21. The method of claim 19, further comprising:
transmitting control signaling that indicates a periodic grant for uplink transmission for transmitting the uplink packet transmission comprising the copy of the uplink packet on a component carrier of the subset of the plurality of configured component carriers.

22. The method of claim 19, further comprising:
transmitting downlink control information that indicates a grant for uplink transmission for transmitting the uplink packet transmission comprising the copy of the uplink packet on a component carrier of the subset of the plurality of configured component carriers.

23. The method of claim 19, wherein monitoring for the uplink packet transmission comprises:
determining not to monitor for the copy of the uplink packet on a first component carrier of the plurality of configured component carriers based at least on part on determining that a number of transmissions of the copy of the uplink packet satisfies the number of copies of the uplink packet to transmit.

24. The method of claim 19, wherein monitoring for the uplink packet transmission comprises:

determining not to monitor for the copy of the uplink packet on any component carrier of the plurality of configured component carriers having a signal strength measurement that does not satisfy a threshold.

25. The method of claim 19, wherein monitoring for the uplink packet transmission comprises:
monitoring a shared radio frequency band for the uplink packet transmission comprising the copy of the uplink packet on a component carrier of the subset of the plurality of configured component carriers.

26. The method of claim 19, wherein monitoring for the uplink packet transmission comprises:
monitoring a frequency range 2 (FR2) frequency band for the uplink packet transmission comprising the copy of the uplink packet on a component carrier of the subset of the plurality of configured component carriers.

27. An apparatus for wireless communications, comprising:
a processor, memory coupled with the processor; and
instructions stored in the memory and executable by the processor to cause the apparatus to:
receive an uplink packet duplication configuration that indicates a plurality of configured component carriers and a number of copies of an uplink packet to transmit on one or more of the plurality of configured component carriers;
receive downlink control information signaling that indicates a selection criterion;
select a subset of the plurality of configured component carriers based at least in part on the selection criterion and the number of copies of the uplink packet to transmit; and
transmit an uplink packet transmission comprising a copy of the uplink packet on each component carrier of the subset of the plurality of configured component carriers based at least in part on the uplink packet duplication configuration.

28. An apparatus for wireless communications, comprising:
a processor,
memory coupled with the processor; and
instructions stored in the memory and executable by the processor to cause the apparatus to:
transmit an uplink packet duplication configuration that indicates a plurality of configured component carriers and a number of copies of an uplink packet to transmit on one or more of the plurality of configured component carriers;
select a subset of the plurality of configured component carriers based at least in part on a selection criterion and the number of copies of the uplink packet to transmit;
transmit downlink control information signaling that indicates the selection criterion; and
monitor for an uplink packet transmission comprising a copy of the uplink packet via at least one component carrier of the subset of the plurality of configured component carriers based at least in part on the uplink packet duplication configuration.

* * * * *